US010945375B2

(12) United States Patent
Desrochers et al.

(10) Patent No.: US 10,945,375 B2
(45) Date of Patent: Mar. 16, 2021

(54) APPARATUS FOR COLLECTING, TRANSPORTING AND DISCHARGING BALES

(71) Applicant: Groupe Anderson Inc., Québec (CA)

(72) Inventors: Patrice Desrochers, Québec (CA); Michaël Gagnon-Bouchard, Québec (CA); Jacques Breton, Québec (CA); David Provencher, Québec (CA)

(73) Assignee: Groupe Anderson Inc., Québec (CA)

( * ) Notice: Subject to any disclaimer, the term of this patent is extended or adjusted under 35 U.S.C. 154(b) by 23 days.

(21) Appl. No.: 16/476,742

(22) PCT Filed: Jan. 10, 2018

(86) PCT No.: PCT/CA2018/050020
§ 371 (c)(1),
(2) Date: Jul. 9, 2019

(87) PCT Pub. No.: WO2018/129617
PCT Pub. Date: Jul. 19, 2018

(65) Prior Publication Data
US 2019/0357440 A1 Nov. 28, 2019

Related U.S. Application Data

(60) Provisional application No. 62/444,585, filed on Jan. 10, 2017.

(51) Int. Cl.
*A01D 90/08* (2006.01)
*A01D 87/12* (2006.01)
(Continued)

(52) U.S. Cl.
CPC ......... *A01D 90/083* (2013.01); *A01D 87/122* (2013.01); *B60P 1/48* (2013.01); *B60P 1/52* (2013.01)

(58) Field of Classification Search
CPC ....... A01D 90/083; A01D 87/122; B60P 1/48; B60P 1/52
(Continued)

(56) References Cited

U.S. PATENT DOCUMENTS 2,792,136 A * 5/1957 Abbott ...................... B60P 1/48
414/551
4,261,676 A 4/1981 Balling, Sr.
(Continued)

FOREIGN PATENT DOCUMENTS

CA 1039242 9/1978
CA 1139718 1/1983
(Continued)

OTHER PUBLICATIONS

International Search Report and Written Opinion for PCT/CA2018/050020, dated Apr. 17, 2018.
(Continued)

*Primary Examiner* — Jonathan Snelting
(74) *Attorney, Agent, or Firm* — Andrus Intellectual Property Law, LLP

(57) ABSTRACT

An apparatus is for collecting and transporting bales. The apparatus includes a transport assembly and a grasping assembly operatively connected thereto. The transport assembly includes a bale loading platform extending above and mounted to a chassis. The bale loading platform comprises at least one bale conveying section in including a bale conveying mechanism. The grasping assembly includes a mechanical arm having a prehension end effector engageable with the bales. The grasping assembly is configurable between a bale engagement configuration for engaging a corresponding one of the bales laying on the ground, a bale capture configuration for capturing and lifting the corresponding one of the bales off the ground and a bale release
(Continued)

configuration for releasing the corresponding one of the bales onto the bale loading platform and comprises a movement absorption mechanism operative to substantially cancel the forward displacement of the apparatus during the capture of the bales.

31 Claims, 11 Drawing Sheets

(51) Int. Cl.
    *B60P 1/48*     (2006.01)
    *B60P 1/52*     (2006.01)

(58) Field of Classification Search
    USPC .......................................................... 414/551
    See application file for complete search history.

(56) References Cited

U.S. PATENT DOCUMENTS

| | | | |
|---|---|---|---|
| 4,329,101 A | | 5/1982 | Green et al. |
| 4,408,942 A | * | 10/1983 | Butler ................. A01D 90/083 414/111 |
| 4,909,694 A | * | 3/1990 | Peters ................. A01D 90/083 298/10 |
| 5,333,981 A | * | 8/1994 | Pronovost ............ A01D 90/083 414/111 |
| 5,340,259 A | * | 8/1994 | Flaskey ................ A01D 90/083 414/111 |
| 5,405,229 A | * | 4/1995 | Tilley .................... A01D 90/08 414/111 |
| 5,725,346 A | * | 3/1998 | Davina .................. A01D 90/08 280/491.1 |
| 6,019,562 A | * | 2/2000 | Cheatham ........... A01D 90/083 414/111 |
| 6,220,811 B1 | | 4/2001 | Bernecker |
| 7,465,140 B2 | * | 12/2008 | Pronovost ............. A01D 90/08 414/111 |
| 8,967,934 B1 | * | 3/2015 | Palmlund ............ A01D 90/083 414/111 |
| 10,136,582 B2 | * | 11/2018 | Neudorf .................. B60P 1/022 |
| 2011/0014022 A1 | | 1/2011 | Shoemaker et al. |
| 2015/0359178 A1 | | 12/2015 | Ramer et al. |

FOREIGN PATENT DOCUMENTS

| | | |
|---|---|---|
| FR | 2620300 | 3/1989 |
| WO | 2015185732 | 12/2015 |
| WO | 2016180838 | 11/2016 |

OTHER PUBLICATIONS

Extended European Search Report for European Patent Application No. 18739095.0, dated Oct. 1, 2020.

\* cited by examiner

APPARATUS FOR COLLECTING, TRANSPORTING AND DISCHARGING BALES

CROSS-REFERENCE TO RELATED APPLICATIONS

This application is the U.S. national stage application of International Application PCT/CA2018/050020, filed Jan. 10, 2018, which international application was published on Jul. 19, 2018, as International Publication WO 2018/129617 in the English language. The International Application claims priority of U.S. Provisional Application No. 62/444, 585, filed Jan. 10, 2017. The international application and U.S. provisional application are both incorporated herein by reference, in their entirety.

TECHNICAL FIELD OF THE INVENTION

The present invention relates to the field of bale transport machinery. More particularly, it relates to an apparatus designed to allow the automated collection, loading, transport and discharge of a plurality of bales, spaced apart from one another in an area such as a field.

BACKGROUND

In the field of agriculture, it is common for numerous wrapped bales scattered around a field (e.g. wrapped bales of hay or the like) to be gathered and moved to a location where the bales are regrouped, for example, for storage thereof.

To proceed to such a gathering of the bales, it is known to use a combination of a tractor equipped with a clamping device for collecting each one of the bales and a trailer for transporting the bales. In such cases, when a single operator is present, the operator is usually required to perform the following steps for each one of the gathered bales or group of bales located closed to one another: 1) stop the tractor close to the bale; 2) unhook the trailer from the tractor to collect the bale(s) using the clamping device of the tractor and to load the bale(s) onto the trailer; and 3) hook the trailer back to the tractor to move the tractor and the trailer towards the next bale (or group of bales) to be picked up. When multiple operators are present, one operator can operate the tractor for collecting and loading the bales onto a trailer being pulled by a second tractor operated by a second operator.

Such a combination of equipment for gathering and transporting bales suffers from several drawbacks. Firstly, it does not allow optimization of material and time resources. Indeed, to perform efficient collection and transport of scattered wrapped bales, multiple operators and corresponding machinery are commonly required, which is undesirable as it increases the necessary material and human resources. On the other hand, to involve only a single operator, the trailer needs to be pulled by the same tractor used for bale loading, which leads to the tractor operator being required to stop at each bale (or group of bales) to unhook the trailer, collect the bale(s), load the bale(s) onto the trailer and hook the trailer back to the tractor. Such frequent stops are ineffective, thereby leading to an increase in time required for performing the task.

Moreover, known machinery for collecting and transporting wrapped bales often requires a double capture and manipulation of each one of the bales. Indeed, a first capture and manipulation is required for loading the bales onto the trailer and a second capture and manipulation is required for unloading the bales from the trailer. Such double capture and manipulation of the bales again increases the time required for performing the task and the risks of tearing of the wrapping material for wrapped bales. In fact, to provide a good quality of wrapped fodder, it is advantageous to perform a minimum amount of grasping of the wrapped bales. Furthermore, known machinery for collecting and transporting wrapped bales can cause undesirable tearing of the wrapping material provided around the bales or compaction of the bale either during loading, transport or discharge of the bales, due to the above-described double manipulation or other factors thereof.

The Applicant is aware of machinery which is designed for automatically picking up bales in the field using a mechanical arm and loading the bales onto a trailer. Such machinery can also be configured to automatically discharge the bales at a predetermined discharge location. Once again, such machinery however suffers from several drawbacks. Amongst other, to prevent dragging of the bales on the ground, it requires the machine to stop (or at least greatly reduce the moving speed to a very low speed) in order to perform the gathering of each one of the bales. Once again, such frequent stops (or speed reduction) are ineffective, thereby leading to an increase in time required for performing the task.

In view of the above, there is a need for an improved apparatus for collecting and transporting bales which, by virtue of its design and components, would be able to overcome or at least minimize some of the above-discussed prior art concerns.

BRIEF SUMMARY OF THE INVENTION

In accordance with a first general aspect, there is provided an apparatus for collecting and transporting bales. The apparatus has a longitudinal axis and a lateral axis and comprises a transport assembly and a grasping assembly. The transport assembly includes a bale loading platform and a chassis with the bale loading platform extending above the chassis and being mounted thereto. The bale loading platform comprises at least one bale conveying section extending along the longitudinal axis, between a forward end and a rearward end of the bale loading platform. Each one of the at least one bale conveying section includes a bale conveying mechanism for moving the bales towards the rearward end of the bale loading platform. The grasping assembly is operatively connected to the transport assembly and includes a mechanical arm having a prehension end effector engageable with the bales. The grasping assembly is configurable between a bale engagement configuration for engaging a corresponding one of the bales laying on a ground surface, a bale capture configuration for capturing and lifting the corresponding one of the bales off the ground surface and a bale release configuration for releasing the corresponding one of the bales onto the bale loading platform. The grasping assembly comprises a movement absorption mechanism operative to substantially cancel the forward displacement of the apparatus during the capture of the bales.

In an embodiment, the apparatus is driven in a displacement direction and wherein the movement absorption mechanism includes at least one section of the mechanical arm moveable longitudinally along the longitudinal axis in a direction opposed to the displacement direction of the apparatus.

In an embodiment, the mechanical arm comprises a laterally extending arm section extending substantially along the lateral axis and a longitudinally extending arm section extending substantially along the longitudinal axis. The laterally extending arm section is connected to the longitudinally extending arm section by an orthogonal joint and is movable longitudinally along the longitudinal axis.

In an embodiment, the orthogonal joint includes a sliding mechanism and an orthogonal joint actuator. The orthogonal joint actuator allows substantially free movement of the longitudinally extending arm section along the sliding mechanism in the direction opposed to the displacement direction of the apparatus and drives the longitudinally extending arm section along the sliding mechanism in the displacement direction of the apparatus.

In an embodiment, the prehension end effector is rotatable between a substantially vertical prehension configuration for engaging a corresponding one of the bales in a vertical orientation and a substantially horizontal configuration for engaging a corresponding one of the bales in an horizontal orientation.

In an embodiment, the at least one bale conveying section comprises a bale loading section and a bale storing section. The conveying mechanism is higher in the bale loading section than in the bale storing section to define a bale stopping step therebetween.

In an embodiment, the bale conveying mechanism comprises a plurality of supporting rollers spaced apart from one another along the longitudinal axis.

In an embodiment, the bale conveying mechanism comprises at least two longitudinally extending rows of supporting rollers.

In an embodiment, the at least two rows of supporting rollers are configured in a V-shaped configuration along at least a section of the bale conveying section.

In an embodiment, the bale loading platform comprises at least two bale conveying sections laterally spaced apart of a lateral spacing distance and at least one of the at least two bale conveying sections is laterally movable along the lateral axis to vary the lateral spacing distance between the at least two bale conveying sections.

In an embodiment, the bale loading platform comprises at least one lateral bale holder at a lateral end thereof. Each one of the at least one lateral bale holder is configurable between a holding configuration where the lateral bale holder engages an outer surface of at least one bale received on the bale loading platform and a distal configuration where the lateral bale holder extends away from the at least one bale received on the bale loading platform.

In an embodiment, the bale loading platform is tiltable between a transport configuration and a discharge configuration.

In an embodiment, in the discharge configuration, the bale loading platform is tiltable to a vertical discharge inclination in which the bale loading platform is tilted of between about 5° and about 10° with respect to the ground surface.

In an embodiment, the apparatus further comprises a bale stopper configurable between an extended configuration and a retracted configuration and comprising at least one central support roller configured to support the bales being discharged, from below, when the bale stopper is configured in the retracted configuration and a lateral support roller engaging a lateral section of the bales being discharged when the bale stopper is configured in the retracted configuration to laterally support the bales during the discharge.

In an embodiment, in the discharge configuration, the bale loading platform is tiltable to an horizontal discharge inclination in which the bale loading platform is tilted of between about 15° and about 20° with respect to the ground surface.

In accordance with another general aspect, there is also provided an apparatus for collecting and transporting bales scattered on a field. The apparatus is driven in a displacement direction and has a longitudinal axis and a lateral axis. The apparatus comprises a supporting chassis; a bale loading platform; and a grasping assembly. The bale loading platform is configured to receive and temporarily support the bales. The bale loading platform extends above the supporting chassis and is engageable with and securable to the supporting chassis and comprises at least one bale conveying section extending along the longitudinal axis between a forward end and a rearward end thereof. The bale conveying section includes a bale conveying mechanism for moving the bales towards the rearward end of the bale loading platform. The grasping assembly is operatively connected to one of the supporting chassis and the bale loading platform and includes a mechanical arm having a prehension end effector engageable with the bales. The mechanical arm has at least three degrees of freedom and is movable between a bale engagement configuration for engaging a corresponding one of the bales scattered on the field and a bale release configuration for releasing the corresponding one of the bales onto the bale loading platform. The grasping assembly further comprises a movement absorption mechanism including at least one section of the mechanical arm moveable along the longitudinal axis in a direction opposite to the displacement direction of the apparatus.

In an embodiment, the mechanical arm comprises a laterally extending arm section extending substantially along the lateral axis and a longitudinally extending arm section extending substantially along the longitudinal axis. The laterally extending arm section is connected to the longitudinally extending arm section by an orthogonal joint and being movable longitudinally along the longitudinal axis.

In an embodiment, the orthogonal joint includes a sliding mechanism and an orthogonal joint actuator. The orthogonal joint actuator allows a substantially free movement of the longitudinally extending arm section along the sliding mechanism in the direction opposed to the displacement direction of the apparatus and drives the longitudinally extending arm section along the sliding mechanism in the displacement direction of the apparatus.

In an embodiment, the mechanical arm has at least four degrees of freedom, the mechanical arm allowing a change in at least one of an orientation and a direction of the bales between the bale engagement configuration and the bale release configuration.

In an embodiment, the mechanical arm has at least five degrees of freedom.

In an embodiment, the prehension end effector is rotatable between a substantially vertical prehension configuration for engaging a corresponding one of the bales in a vertical orientation and a substantially horizontal configuration for engaging a corresponding one of the bales in an horizontal configuration.

In an embodiment, the at least one bale conveying section comprises a bale loading section and a bale storing section. The conveying mechanism is higher in the bale loading section than in the bale storing section to define a bale stopping step therebetween.

In an embodiment, the bale conveying mechanism comprises a plurality of supporting rollers spaced apart from one another along the longitudinal axis.

In an embodiment, the bale conveying mechanism comprises at least two longitudinally extending rows of supporting rollers.

In an embodiment, the at least two rows of supporting rollers are configured in a V-shaped configuration along at least a section of the bale conveying section.

In an embodiment, the bale loading platform comprises at least two bale conveying sections laterally spaced apart of a lateral spacing distance and at least one of the at least two bale conveying sections is laterally movable along the lateral axis to vary the lateral spacing distance between the at least two bale conveying sections.

In an embodiment, the bale loading platform comprises at least one lateral bale holder at a lateral end thereof. Each one of the at least one lateral bale holder is configurable between a holding configuration where the lateral bale holder engages an outer surface of at least one bale received on the bale loading platform and a distal configuration where the lateral bale holder extends away from the at least one bale received on the bale loading platform.

In an embodiment, the bale loading platform is tiltable between a transport configuration and a discharge configuration.

In an embodiment, in the discharge configuration, the bale loading platform is tiltable to a vertical discharge inclination in which the bale loading platform is tilted of between about 5° and about 10° with respect to the ground surface.

In an embodiment, the apparatus further comprises a bale stopper configurable between an extended configuration and a retracted configuration and comprising at least one central support roller configured to support the bales being discharged, from below, when the bale stopper is configured in the retracted configuration and a lateral support roller engaging a lateral section of the bales being discharged when the bale stopper is configured in the retracted configuration to laterally support the bales during the discharge.

In an embodiment, in the discharge configuration, the bale loading platform is tiltable to an horizontal discharge inclination in which the bale loading platform is tilted of between about 15° and about 20° with respect to the ground surface.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which:

FIGS. 5A to 5E are perspective views of the apparatus for collecting and transporting bales of FIG. 1 shown hooked to a powered vehicle and showing a sequence of operation of the grasping assembly thereof for collecting a bale and loading the bale onto a bale loading platform of the apparatus, wherein:

FIG. 5A is a perspective view of the apparatus for collecting and transporting bales of FIG. 1, wherein the grasping assembly is configured in a bale engagement configuration;

FIG. 5B is a perspective view of the apparatus for collecting and transporting bales of FIG. 1, wherein the grasping assembly is configured in a bale capture configuration, with the bale still engaged to the ground;

FIGS. 5C and 5D are perspective views of the apparatus for collecting and transporting bales of FIG. 1, wherein the grasping assembly is moved between the bale capture configuration and a bale release configuration; and FIG. 5E is a perspective view of the apparatus for collecting and transporting bales of FIG. 1, wherein the grasping assembly is configured in the bale release configuration.

DETAILED DESCRIPTION

In the following description, the same numerical references refer to similar elements. The embodiments, geometrical configurations, materials mentioned and/or dimensions shown in the figures or described in the present description are embodiments only, given solely for exemplification purposes.

Moreover, although the embodiments of the apparatus for collecting and transporting bales and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the apparatus for collecting and transporting bales, as will be briefly explained herein and as can be easily inferred herefrom by a person skilled in the art. Moreover, it will be appreciated that positional descriptions such as "above", "below", "left", "right" and the like should, unless otherwise indicated, be taken in the context of the figures and should not be considered limiting.

Figure 1:
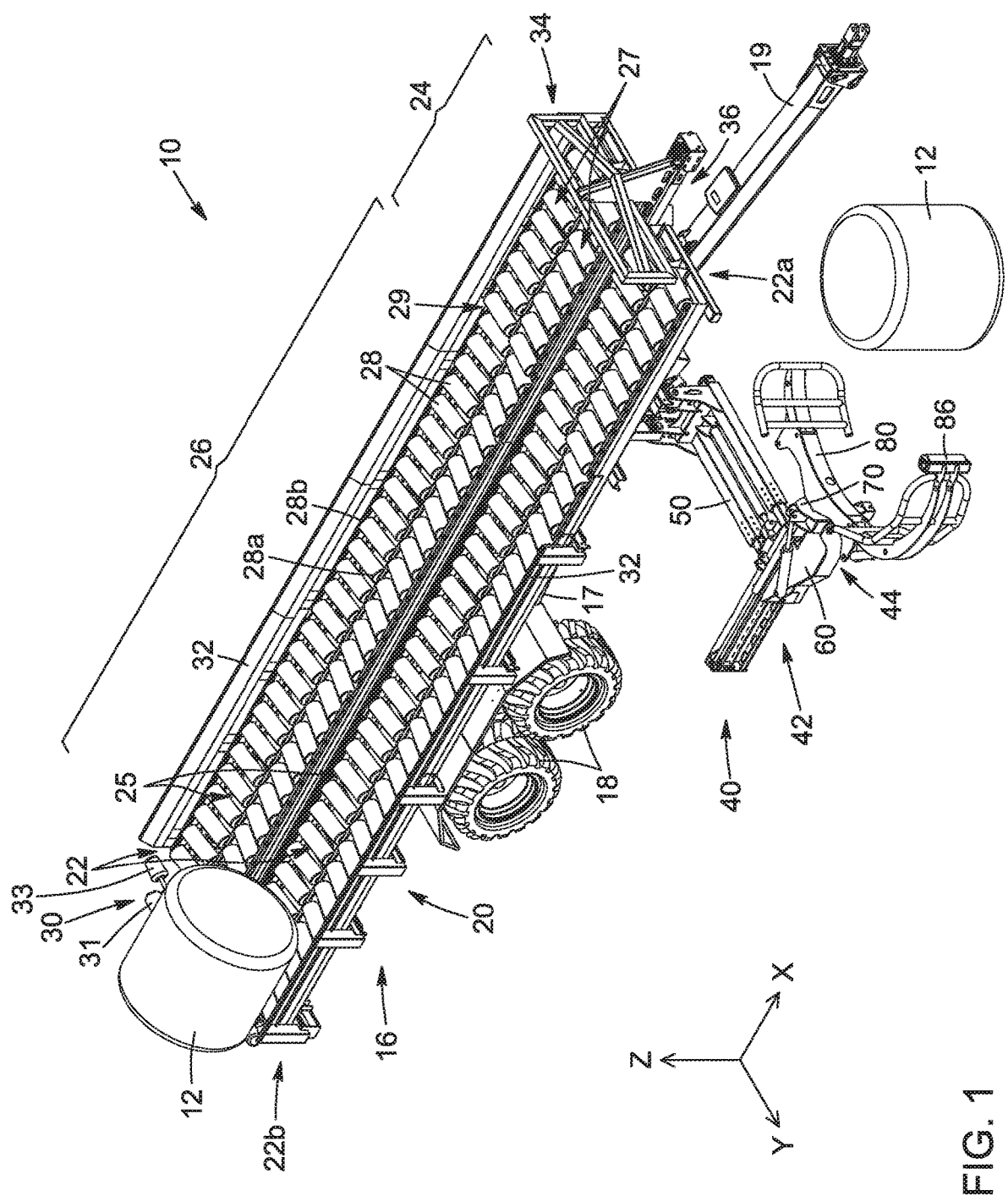
FIG. 1 is a perspective view of the apparatus for collecting and transporting bales in accordance with an embodiment.
Figure 2:
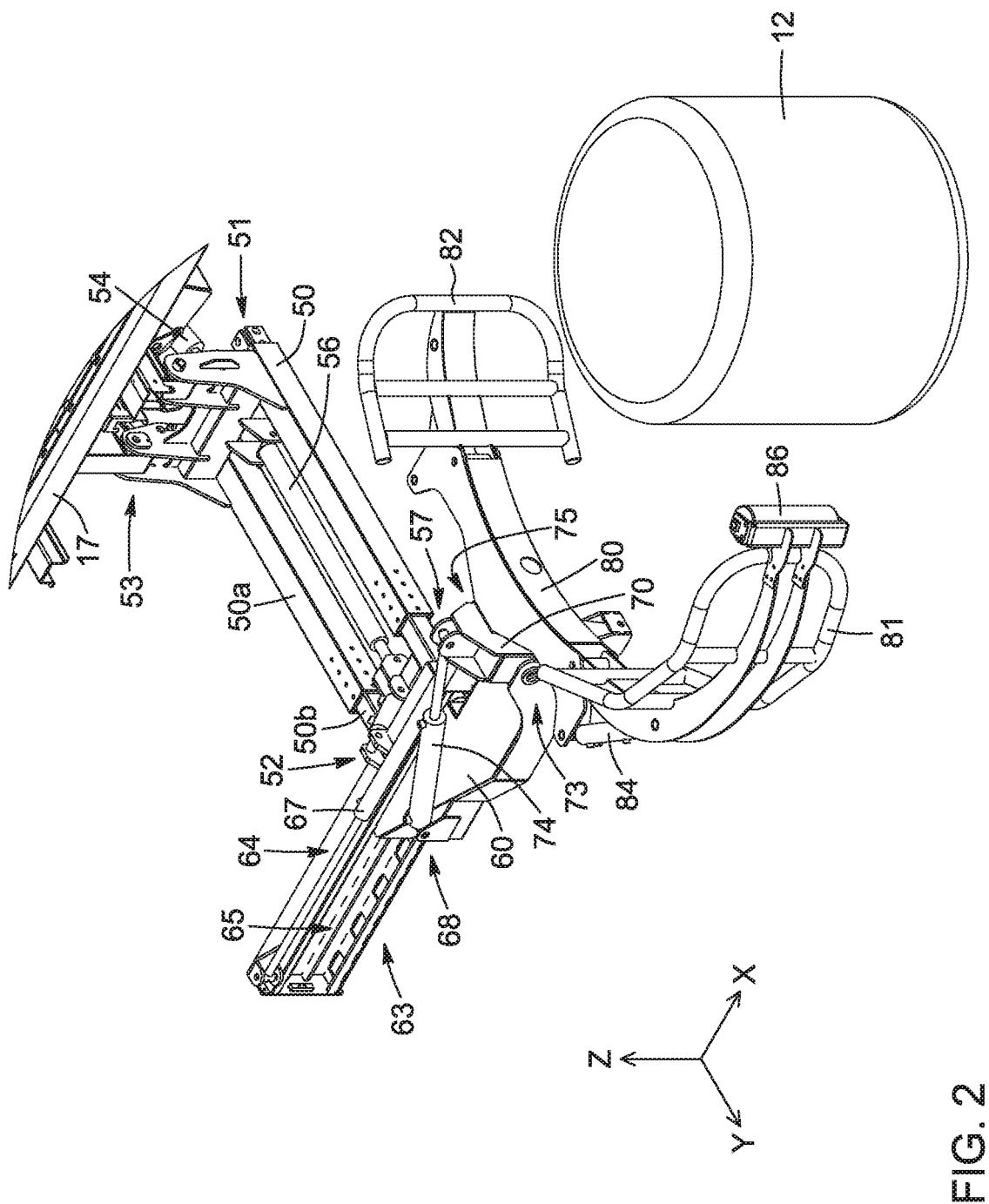
FIG. 2 is a close-up perspective view of the grasping assembly of the apparatus for collecting and transporting bales of FIG. 1, wherein a laterally extending arm section of the grasping assembly is configured in a retracted configuration and the end effector of the mechanical arm of the grasping assembly is configured in a substantially vertical prehension configuration.

Referring generally to FIGS. 1 and 2, in accordance with one embodiment, there is provided an apparatus 10 for collecting and transporting bales 12, such as, without being limitative bales of hay, haylage, straw, corn straw, or the like, scattered in an area, such as, without being limitative, a field. The apparatus 10 includes a transport assembly 16 and a grasping assembly 40. The transport assembly 16 includes a chassis 17 and a bale loading platform 20 extending above the chassis 17 and being mounted thereto. The grasping assembly 40 is connected to the transport assembly 16 and is operative to collect and load successive bales 12 onto the bale loading platform 20, as the apparatus 10 is moved over the ground, in the area around which the bales 12 are scattered. In an embodiment, the apparatus 10 allows scattered bales 12 to be collected and loaded thereon, by a single operator, without requiring the apparatus 10 (and, in an embodiment the powered vehicle, such as a tractor pulling the apparatus 10) to stop for collection of each one of the scattered bales 12.

In the embodiment shown, as it will become apparent in view of the description below, the apparatus 10 is also adapted to perform collection, loading, transport and discharged of wrapped bales, without tearing (or damaging) the wrapping material of the bales.

In the embodiment shown, the apparatus 10 is of the trailer type (i.e. the apparatus 10 is an unpowered vehicle attachable to a powered vehicle, such as, for example and without being limitative, a tractor, for displacement of the apparatus 10). One skilled in the art will understand that, in an alternative embodiment, the apparatus 10 could be self powered, (i.e. it could include the necessary components for the apparatus to be propelled without the need to be combined to an additional powered vehicle for displacement thereof).

Referring to FIG. 1, in the embodiment shown, the chassis 17 includes a support frame attached to a wheeled axle assembly (i.e. at least one axle having a set of wheels 18 mounted thereon) for supporting the bale loading platform 20 onto the ground and allowing displacement of the apparatus 10 on the ground. One skilled in the art will understand that, in alternative embodiments (not shown) other components allowing displacement of the apparatus 10, such as caterpillar tracks or the like, could be provided on the chassis 17, rather than the wheels 18 of the embodiment shown. In the embodiment shown, the chassis 17 also includes a pole 19 with a coupling mechanism for hitching the apparatus 10 to a powered vehicle.

Referring to FIG. 1, the bale loading platform 20 of the apparatus 10 is a platform configured for receiving and temporarily supporting the bales 12 thereon. In the embodiment shown, the bale loading platform 20 includes two bale conveying sections 22, extending longitudinally along a longitudinal axis X extending between a forward end 22a and a rear end 22b of the bale loading platform 20. The two bale conveying sections 22 are spaced apart from one another and extend substantially parallel to one another. One skilled in the art will understand that, in an alternative embodiment, the bale loading platform 20 can include only one bale conveying section 22 or more than two bale conveying sections 22 and that the bale conveying sections 22 can be positioned and/or oriented differently than the embodiment shown. For example and without being limitative, the bale conveying sections 22 could extend laterally, along a lateral axis Y substantially perpendicular to the longitudinal axis X.

In the embodiment shown, each bale conveying section 22 includes a bale loading section 24, a bale storing section 26, with a bale conveying mechanism 25 extending longitudinally along the longitudinal axis X, over substantially the length of the bale conveying section 22 (i.e. extending substantially between the forward end 22a and the rear end 22b of the bale loading platform 20) to convey the bales 12 from the bale loading section 24 to the bale storing section 26 while substantially preventing tearing of the wrapping material as the bales 12 are moved along the bale conveying section 22. In the embodiment shown, the bale conveying mechanism 25 includes two rows 27 of supporting rollers 28, wherein each one of the supporting rollers 28 is a rotatable free rolling roller, such that the bales 12 can move along the corresponding bale conveying section 22, with minimal friction between the bale 12 and the rollers 28. One skilled in the art will understand that, in an alternative embodiment (not shown), a single row 27 of supporting rollers 28 or more than two rows 27 of supporting rollers 28 can be provided. Moreover, in another alternative embodiment (not shown) a bale conveying mechanism different that the plurality of supporting rollers 28, such as, without being limitative, a belt conveyor or the like, could be used for movement of the bales 12 along the bale conveying section 22, without tearing of the wrapping material of the bales 12.

Figure 6:
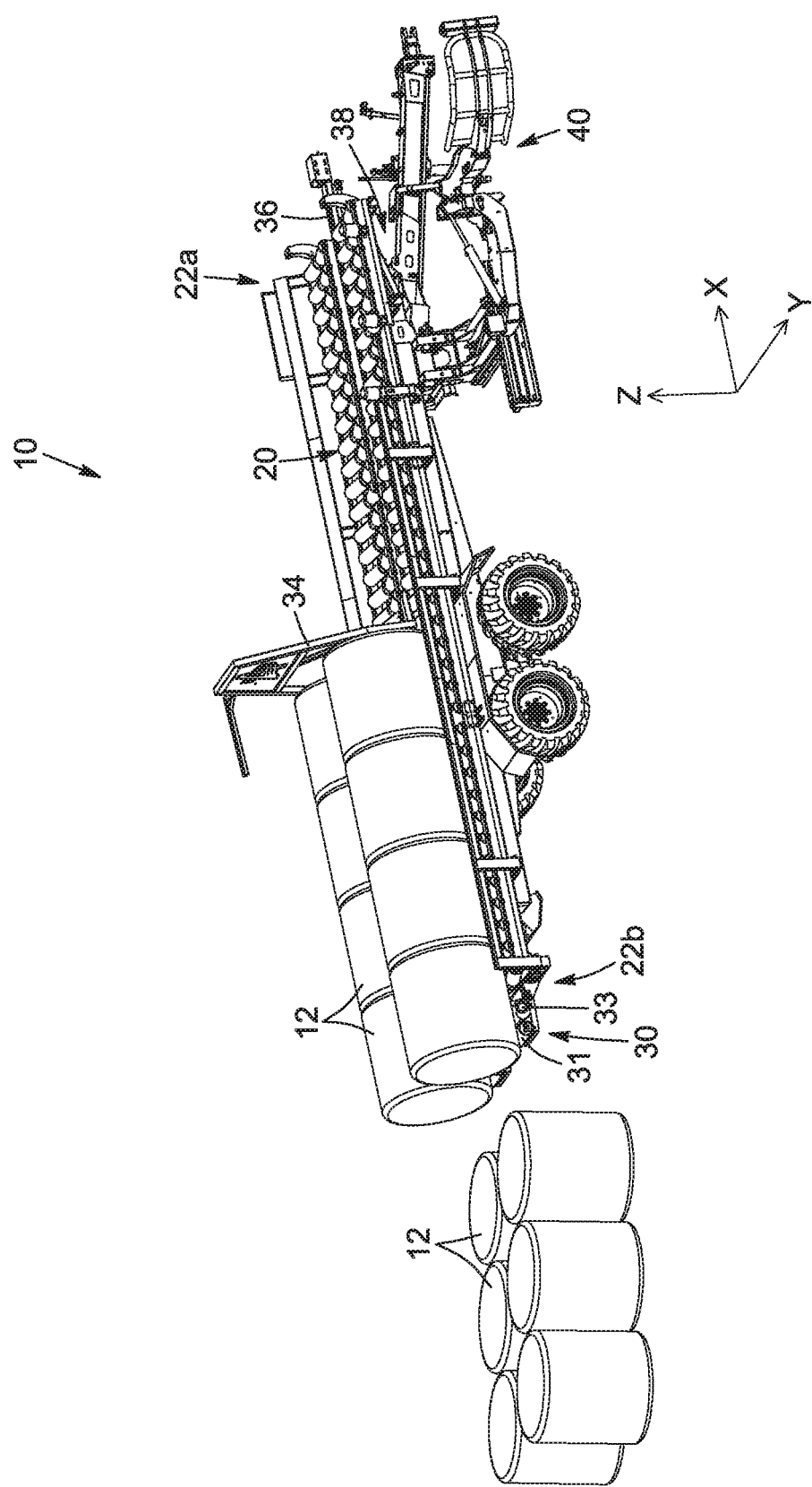
FIG. 6 is a perspective view of the apparatus for collecting and transporting bales, in accordance with an embodiment having similar characteristics than the embodiment of FIG. 1 but with minor adjustments, and where the bale loading platform is tilted in a vertical discharge inclination to discharge the bales in a vertical orientation.
Figure 7:
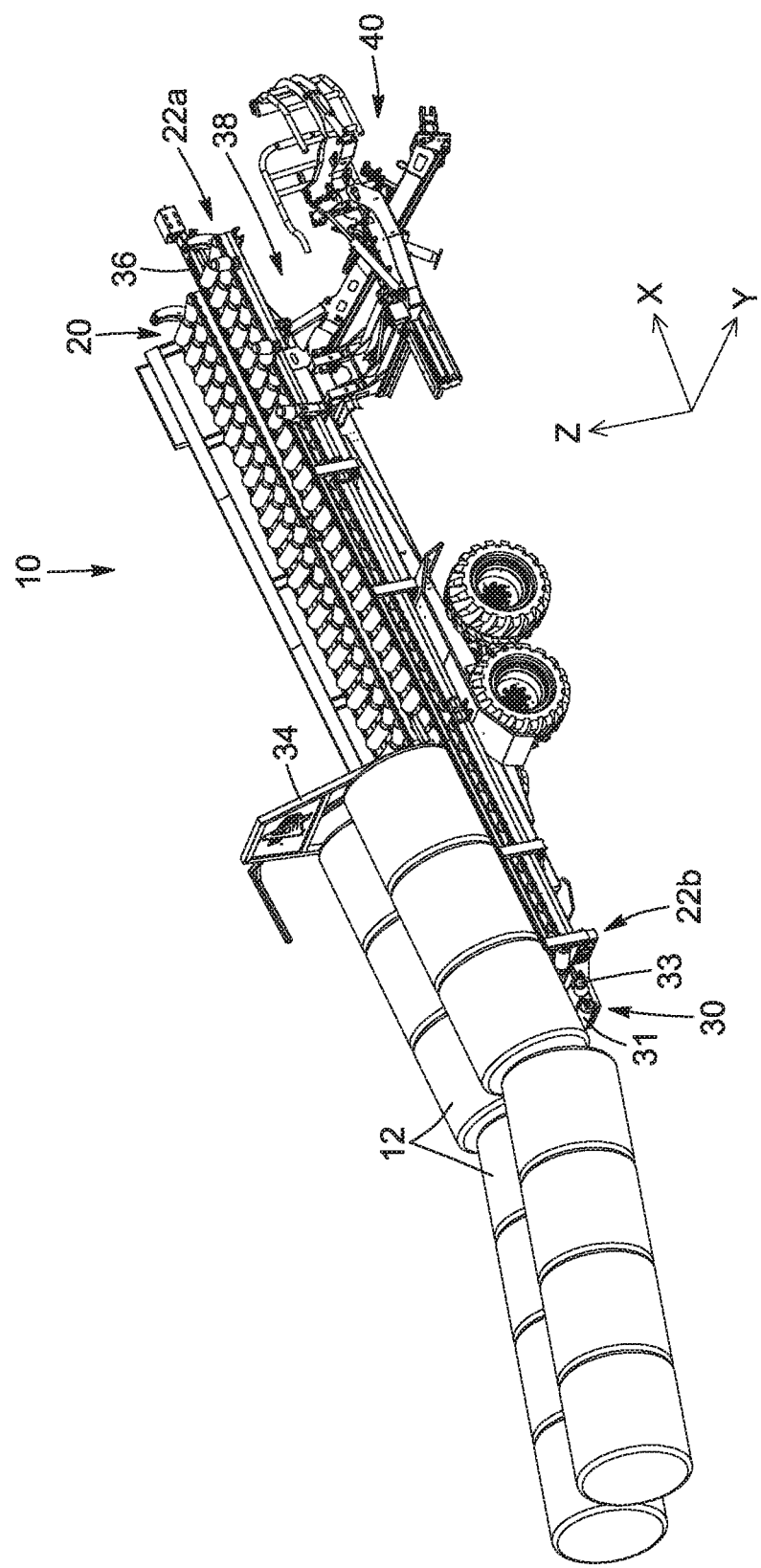
FIG. 7 is a perspective view of the apparatus for collecting and transporting bales in accordance with an embodiment having similar characteristics than the embodiment of FIG. 1 but with minor adjustments, and where the bale loading platform is tilted in an horizontal discharge inclination to discharge the bales in an horizontal orientation.

Referring to FIGS. 1, 6 and 7, in an embodiment, to move the bales 12 along the bale conveying section 22, the bale loading platform 20 includes a bale pusher 34 displaceable along the longitudinal axis X. The bale pusher 34 is movable between a forward position (shown in FIG. 1) and a rearward position (not shown). In the forward position (shown in FIG. 1), the bale pusher 34 is positioned at the forward end 22a of the bale loading platform 20 (or proximate thereto). When moved between the forward position and the rearward position, the bale pusher 34 is moved along the longitudinal axis X towards the rear end 22b of the bale loading platform 20 to engage and drive the at least one bale towards the rear end 22b of the bale loading platform 20. In FIGS. 6 and 7, the bale pusher 34 is shown in an intermediate position, between the forward position and the rearward position, as it pushes the bales 12 to be discharged towards the rear end 22b of the bale loading platform 20. In the embodiment shown, a single bale pusher 34 is configured to spread over all the bale conveying sections 22 and therefore be engageable with the bales 12 positioned in each one of the bale conveying sections 22, to drive the bales 12 towards the rear end 22b of the bale loading platform 20 in a single push. One skilled in the art will understand that, in an alternative embodiment (not shown), a distinct bale pusher 34 can be provided for each bale conveying section 22. In an embodiment, a bale pusher displacement assembly 36 is provided to allow the longitudinal displacement of the bale pusher 34 along the longitudinal axis X and for driving the bale pusher 34 between the forward position and the rearward position.

One skilled in the art will understand that, in alternative embodiments (not shown), assemblies different from the above-described bale pusher 34 can be provided for driving the bales 12 along the bale conveying section 22. For example and without being limitative, in an embodiment (not shown) each bale conveying section 22 could have a rearward inclination to favor movement of each one of the bales 12 towards the rear end 22b of the bale loading platform 20. In another alternative embodiment (not shown), the bale conveying mechanism 25 can be actuated to control the movement of the bales 12 along the longitudinal axis X of the corresponding bale conveying section 22.

In the embodiment shown, the supporting rollers 28 of the bale loading section 24 are higher than the supporting rollers 28 of the bale storing section 26, thereby creating a bale stopping step 29 between the supporting rollers 28 of the bale loading section 24 and the supporting rollers 28 of the bale storing section 26. Therefore, in such an embodiment, bales 12 are prevented from inadvertently being moved back from the bale storing section 26 to the bale loading section 24, once they reach the bale storing section 26. For example and without being limitative, in an embodiment the supporting rollers 28 of the bale loading section 24 are higher than the supporting rollers 28 of the bale storing section 26 of a distance of at least about ten centimeters.

In an embodiment, to better support the bales 12 laterally, the supporting rollers 28 of the two rows 27 of supporting rollers 28 are angled inwardly (i.e. the supporting rollers 28 of the two rows 27 of supporting rollers 28 are each angled such that an inner end 28a thereof is lower than a corresponding outer end 28b) at least along the bale storing section 26. Hence, the two rows 27 of supporting rollers 28 are configured in a V-shaped configuration. The V-shaped configuration of the two rows 27 of supporting rollers 28 helps supporting the bales 12 laterally and thereby substantially prevents lateral movement of the bales 12. One skilled in the art will understand that, in an embodiment, the two rows 27 of supporting rollers 28 could be configured in the V-shaped configuration along the entire bale conveying section 22 or along only the bale storing section 26 or a section thereof.

In an embodiment, to allow the bale loading platform 20 to adapt to different sizes of bales 12, a lateral distance between the two conveying sections 22 can be varied. Hence, the lateral distance between the two conveying sections 22 can be smaller to accommodate smaller bales 12 and can be larger to accommodate larger bales 12. For example and without being limitative, in an embodiment, the supporting rollers 28 of each conveying section 22 can be mounted to an independent support structure (not shown) and at least one of the support structure of the two conveying sections 22 can be movable laterally (i.e. in a direction substantially perpendicular to the longitudinal axis X) to vary the lateral distance between the two conveying sections 22. For example, and without being limitative, in an embodiment (not shown), a rack and pinion assembly, a hydraulic cylinder, a pneumatic cylinder, an electric cylinder or other types of linear actuator can be used to operatively connect the support structures of the two conveying sections 22, to allow the lateral displacement of the support structure(s) with regard to one another and thereby vary the lateral distance between the two conveying sections 22.

In an embodiment, the bale loading platform 20 also includes lateral bale holders 32 positioned at lateral ends of the bale loading platform 20. The lateral bale holders 32 extend longitudinally along the longitudinal axis X, at lateral ends of the bale loading platform 20, to provide increased lateral support to the bales 12 and prevent the bales 12 from falling off the bale loading platform 20, for example in the case of swift lateral movements of the apparatus 10.

In an embodiment, at least one of the lateral bale holder 32 can be configurable between a holding configuration (not shown) and a distal configuration (see FIG. 1). In the holding configuration, the lateral bale holder 32 is moved towards the corresponding bale conveying section 22 and is engageable with at least one bale 12 located in the bale storing section 26 of the corresponding bale conveying section 22. Hence, in the holding configuration, the lateral bale holder 32 substantially prevents movement of the bale 12 along the longitudinal axis X, as a result of the friction force between the lateral bale holder 32 and the outer surface of the bale 12. In the distal configuration, the lateral bale holder 32 extends away from the corresponding bale conveying section 22 and is spaced apart from the bales 12 located on the corresponding bale conveying section 22, thereby not hindering the movement thereof along the longitudinal axis X. In an embodiment, the lateral bale holders 32 is pivotally mounted and can therefore be pivoted (either manually or mechanically) between the holding configuration and the distal configuration. One skilled in the art will understand that, in an alternative embodiment, the lateral bale holder 32 can be moved between the distal configuration and the holding configuration differently than by pivoting thereof, such as, for example and without being limitative, by lateral sliding of the lateral bale holder 32 or the like.

Referring to FIGS. 1, 5A, 6 and 7, in an embodiment, the bale loading platform 20 further includes at least one bale stopper 30 at the rear end 22b thereof. The bale stopper 30 is configurable between an extended (or operative) configuration (shown in FIGS. 1 and 5A) and a retracted (or inoperative) configuration (shown in FIGS. 6 and 7). In the extended configuration (shown in FIGS. 1 and 5A), the bale stopper 30 is positioned across a movement path of the bales 12 stored in the bale storing section 26 of the corresponding bale conveying section 22 and is engageable with an end of the most rearward bale 12 of the bale storing section 26, to maintain the bales 12 onto the bale loading platform 20 and prevents discharge of the bales 12 from the bale loading sections 24. In the retracted configuration (shown in FIGS. 6 and 7), the bale stopper 30 is positioned away from the movement path of the bales 12 stored in the bale storing section 26 of the corresponding bale conveying section 22 and allow easy discharge of the bales 12 from the bale loading section 24. In an embodiment, the bale stopper 30 is pivotally mounted and can therefore be pivoted (either manually or mechanically) between the extended configuration used during loading and transport of the bales 12 and the retracted configuration used for discharge of the bales 12 from the bale loading platform 20. In the embodiment shown, two bale stoppers 30 are provided, with each one of the bale stoppers corresponding to one bale conveying section 22. One skilled in the art will however understand that, in an alternative embodiment a single bale stopper 30 for all the bale conveying section 22 can be provided.

In the embodiment shown, the at least one bale stopper 30 is configured to support the bales 12 being discharged when configured in the retracted configuration (see FIGS. 6 and 7), and includes at least one central support roller 31 and a lateral support roller 33. In such an embodiment, the at least one bale stopper 30 is substantially parallel and evenly levelled with the corresponding bale storing section 26 when configured in the retracted configuration (see FIGS. 6 and 7). The at least one central support roller 31 is configured to support the bales 12 being discharged, from below, and allow the bales 12 to move onto the bale stopper 30 configured in the retracted configuration, with minimal friction. The lateral support roller 33 engages a lateral section of the bales 12 being discharged, on the side of the bale positioned closer to the closest lateral end of the bale loading platform 20, in order to laterally support the bales 12, and prevent the bales 12 from moving laterally as hey moves onto the bale stopper 30 configured in the retracted configuration, during the discharge. In other words, the lateral support roller 33 maintains the bales 12 in the direction of the longitudinal axis X, to follow the movement path of the bales 12. The central support rollers 31 and the lateral support roller 33 are once again rotatable free rolling rollers, such that the bales 12 can move along the bale stopper 30 configured in the retracted configuration, with minimal friction between the bale 12 and the rollers 31, 33.

One skilled in the art will understand that, in an alternative embodiment (not shown), the bale stopper 30 can be moved from the retracted configuration and the extended configuration differently than by pivoting thereof, such as, for example and without being limitative, by sliding or the like. In another alternative embodiment, the bale stopper 30 can be removable (rather than movable to a retracted configuration) to allow the discharge of the bales 12 from the bale loading platform 20. In another alternative embodiment (not shown), the bale stopper 30 can be free of roller and be configured not to contact the bales 12 as they are being discharged. It will be understood that in such alternative embodiments, the lateral support rollers 33 can be part of the bale loading platform, rather than the bale stopper 30 to provide lateral support of the bales 12 during discharge.

In the embodiment shown, the bale loading platform 20 is tiltable between a transport configuration (shown in FIG. 1) and a discharge configuration (shown in FIGS. 6 and 7). In the transport configuration (see FIG. 1), the bale loading platform 20 extends substantially horizontally. In the discharge configuration (see FIGS. 6 and 7), the bale loading platform 20 is tilted rearwardly to drive the bales towards the rear end 22b of the bale loading platform 20 by gravity and to reduce the vertical distance between the rear end 22b of the bale loading platform 20 and the ground. When the bale loading platform 20 is configured in the discharged configuration, the bale stopper(s) 30 can be configured in the retracted (or inoperative) configuration to allow discharge of the bales 12. In an embodiment, to discharge the bales 12, the apparatus 10 is moved forwardly and the bale pusher 34 is used to push the bales 12 towards the rear end 22b of the loading platform 20. Such a combination allows discharge of the bales 12 with substantially no dragging of the bales 12 on the ground and with adjacent bales 12 being held proximal to one another.

Referring to FIGS. 6 and 7, in an embodiment, in the discharge configuration, the bale loading platform 20 can be tilted to a vertical discharge inclination (see FIG. 6) or to an horizontal discharge inclination (see FIG. 7). The vertical discharge inclination shown in FIG. 6 allows the bales 12 to be discharged vertically (i.e. the bales 12 stand in an upright orientation after being discharged), next to one another. When the bale loading platform 20 is tilted to the vertical discharge inclination, the inclination of the bale loading platform 20 is such that it allows the bales to pivot from the horizontal orientation (i.e. their orientation on the bale loading platform 20) to the vertical orientation during the discharge, as can be seen in FIG. 6. In an embodiment, the lateral support roller 33 of the bale stopper 30 prevents the bales 12 from laterally falling on the side (i.e. prevents the bales from moving to the horizontal orientation as a result of undesired lateral movement) during the above described pivoting of the bales 12, therefore allowing such vertical discharge. In an embodiment, the vertical discharge inclination corresponds to an inclination of the loading platform between about 5° and 10° with respect to the ground surface. More particularly, in an embodiment, the vertical discharge inclination corresponds to an inclination of the loading platform between about 7° and 8°. The horizontal discharge inclination shown in FIG. 7 allows the bales 12 to be discharged horizontally (i.e. the bales 12 lay in an horizontal orientation after being discharged), next to one another. When the bale loading platform 20 is tilted to the horizontal discharge inclination, the inclination of the bale loading platform 20 is such that the bales remain in the horizontal orientation (i.e. remain in a sideway orientation where they are laying down on one side) during the discharge, as can be seen in FIG. 7. In an embodiment, the vertical discharge inclination corresponds to an inclination of the loading platform between about 15° and 20° with respect to the ground surface. In an embodiment, a bale loading platform tilting mechanism 38 is provided to perform the tilting of the bale loading platform 20 (i.e. to allow the tilting of the bale loading platform 20 between the transport and the discharge configuration).

Figure 3:
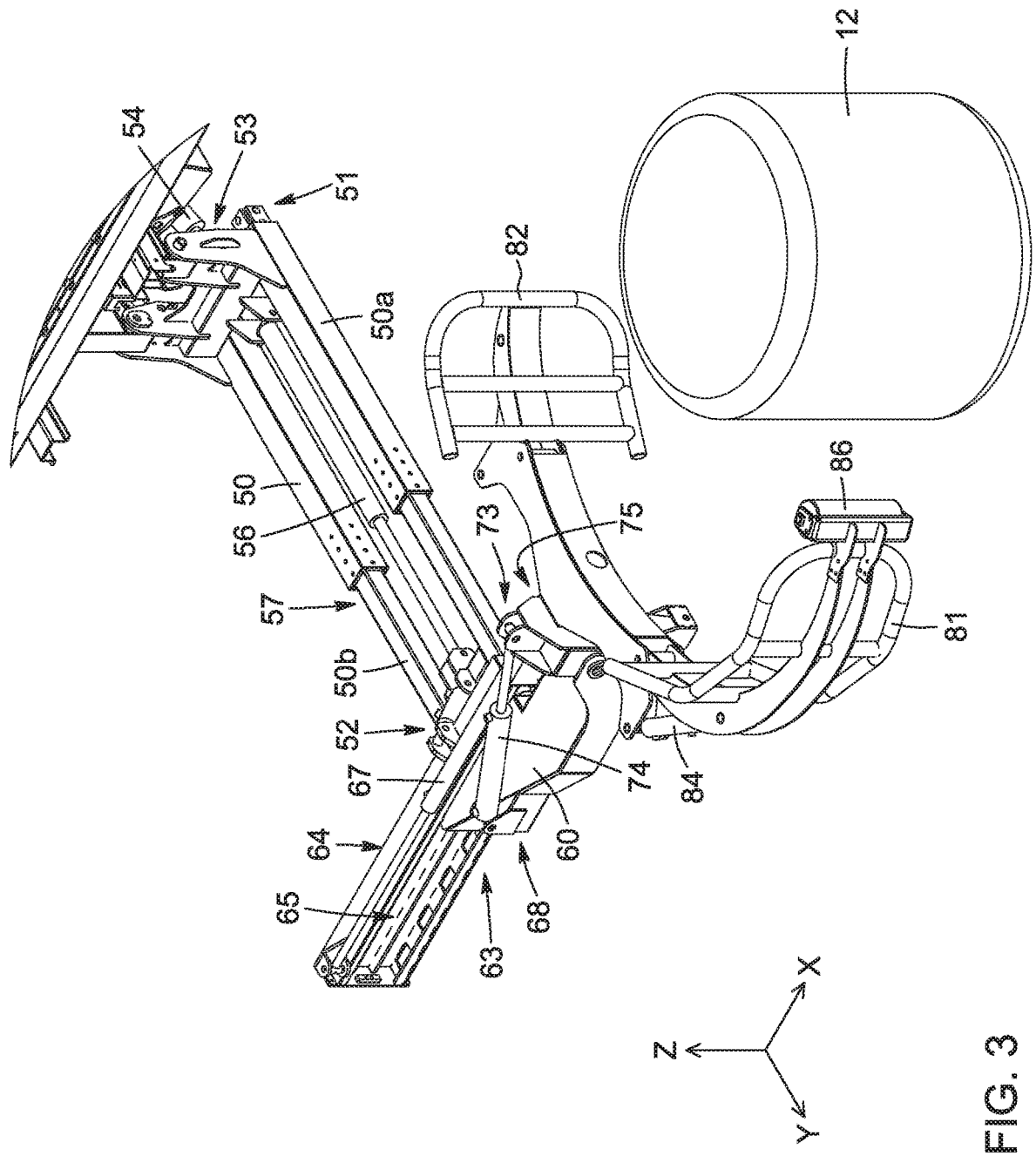
FIG. 3 is a perspective view of the apparatus for collecting and transporting bales of FIG. 1, wherein the laterally extending arm section of the grasping assembly is configured in an extended configuration and the end effector of the mechanical arm of the grasping assembly is configured in the substantially vertical prehension configuration.
Figure 4:
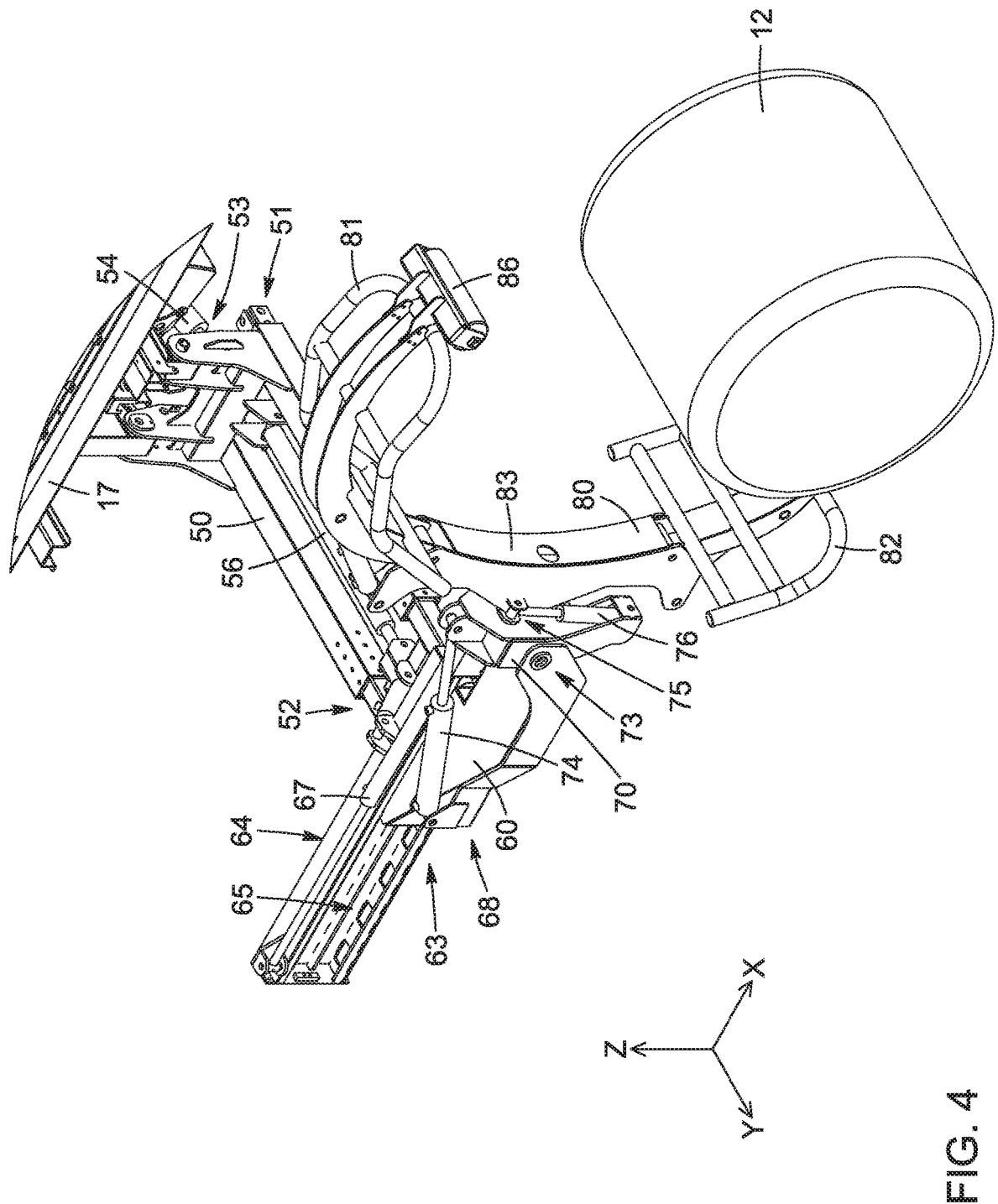
FIG. 4 is a perspective view of the apparatus for collecting and transporting bales of FIG. 1, wherein the end effector of the mechanical arm of the grasping assembly is configured in a substantially horizontal prehension configuration.

Now referring to FIGS. 2 to 4, the grasping assembly 40 of the apparatus 10 includes a mechanical arm 42 pivotally mounted to the transport assembly 16 and a prehension end effector 80 at a prehension end 44 of the mechanical arm 42. The prehension end effector 80 includes a prehension device which is designed to interact and, more particularly, seize, grasp or pick the bale 12 from the ground, hold the bale 12 during the transition of the mechanical arm 42 towards a bale release configuration and subsequently release the bale 12 on the bale loading platform 20.

The grasping assembly 40 has at least 3 degrees of freedom. The 3 degrees of freedom correspond to the requisite freedom to perform the required movement between the capture of the bale 12 on the ground by the prehension end effector 80 and the release of the bale 12 on the bale loading platform 20, while substantially cancelling the displacement of the apparatus 10 over the ground during a capture phase of the bale 12. As will be described in more details below, in the embodiment shown, two degrees of freedom are provided by a pitching movement of the prehension end effector 80 (i.e. a rotating movement along the longitudinal axis X) and a rolling movement of the prehension end effector 80 (i.e. a rotating movement along the lateral axis Y) and the third degree of freedom is provided by an linear longitudinal displacement of a section of the mechanical arm 42 (to substantially cancel the displacement of the apparatus 10 over the ground during the capture phase of the bale 12). One skilled in the art will understand that, in an alternative embodiment, the three degrees of freedom could correspond to different movements of the prehension end effector 80 than the above-mentioned pitching movement, rolling movement and the linear longitudinal displacement of a section of the mechanical arm 42.

As will also be described in more details below, in the embodiment shown, the grasping assembly 40 has five degrees of freedom. In the embodiment shown, the additional two degrees of freedom further allow a change in orientation of the end effector 80 (in order to allow the capture of bales 12 in different orientation on the ground, such as a vertical (or upright) orientation (See FIGS. 2 and 3) or an horizontal (or sideways) orientation (see FIG. 4)) and an extension or retraction of a section of the mechanical arm 42 (for example to allow the release of bales 12 on top of bales previously received in the bale conveying sections 22, thereby allowing an additional row of bales 12 to be created above and between the bales loaded in the bale conveying sections 22). One skilled in the art will understand that, in alternative embodiments (not shown), the grasping assembly 40 could also have additional degrees of freedom. Indeed, it is understood that the grasping assembly 40 can allow greater movement of the bale 12 than the above described movement and/or can have a higher number of degrees of freedom than it is using to perform its task. Moreover, one skilled in the art will understand that, in the course of the present description, the term "having" with reference to the amount of degrees of freedom refers to the amount of degrees of freedom that a mechanical arm (or assembly, or manipulator) effectively has, while the term "using" refers to the amount of degrees of freedom that the mechanical arm uses to perform its task, i.e. in an embodiment a mechanical arm can have more degrees of freedom than it actually uses to perform its task.

In the course of the present description, when used to describe the orientation of a bale 12, the term "orientation" is used to describe the positioning of the bale 12 with regards to the ground (i.e. a change of orientation is understood to mean a change in the inclination of the bale 12 with regards to the ground). Thus, to perform a change of orientation, the bale 12 is rotated about a rotation axis parallel to the ground (e.g. the longitudinal axis X or the lateral axis Y). In opposition, the term "direction", when referring to the bale 12, is used to describe the configuration of the bale 12 with regards to a vertical axis Z, substantially perpendicular to a ground plane defined by the longitudinal axis X and the lateral axis Y, i.e. a change of direction is understood to mean a rotation of the bale 12 while remaining in the same orientation with regards to the ground. Thus, to perform a change of direction, the bale 12 is rotated about the vertical axis Z substantially perpendicular to the ground.

As can be seen in FIGS. 2 to 4, in the embodiment shown, the mechanical arm 42 is a serial arm including a laterally extending arm section 50, a longitudinally extending arm section 60 and an end section 70. Each section (or link) is connected to an adjacent section (or link) by a motor-actuated (or mechanically actuated) joint. The end section 70 is connected to the end effector 80 which interacts with the bales 12.

The laterally extending arm section 50 extends substantially along the lateral axis Y. In the embodiment shown, the mechanical arm 42 includes a rotational joint 53 pivotally connecting the laterally extending arm section 50 to the chassis 17 of the transport assembly 16, at a proximal end 51 of the laterally extending arm section 50. The rotational joint 53 allows pivoting of the laterally extending arm section 50 with respect to the transport assembly 16. In the embodiment shown, the rotational joint 53 includes a proximal end linear actuator 54 mounted between the chassis 17 and the laterally extending arm section 50, to pivot the laterally extending arm section 50 with regards to the transport assembly 16. In an embodiment, the proximal end linear actuator 54 is an hydraulic cylinder, but one skilled in the art will understand that, in an alternative embodiment, the proximal end linear actuator 54 could be another type of linear actuator, a rotational actuator, or the like.

One skilled in the art will understand that, in an alternative embodiment, not shown, the mechanical arm 42 could present a different configuration than the embodiment shown and/or could include different components to provide a similar or greater degree of freedom (i.e. to allow pivoting of a section of the mechanical arm 42 with respect to the transport assembly 16). For example and without being limitative the rotational joint 53 could pivotally connect two sections of the mechanical arm 42 rather than pivotally connecting the laterally extending arm section 50 to the chassis 17 of the transport assembly 16 and/or could be a twisting joint or a revolving joint rather than a rotational joint.

In an embodiment, and as can be better seen in FIGS. 2 and 3, the laterally extending arm section 50 includes a collinear joint 57 connecting a first link 50*a* and a second link 50*b* thereof. The collinear joint 57 allows the laterally extending arm section 50 to be configured between a retracted configuration (see FIG. 2) and an extended configuration (see FIG. 3), for example to allow the release of bales 12 on top of bales previously received in the bale conveying sections 22 as mentioned above. In the embodiment shown, the first link 50*a* and the second link 50*b* are telescopic links (i.e. links joined in a telescopic arrangement) and the collinear joint 57 includes a telescopic link linear actuator 56 operatively connected between the first link 50*a* and the second link 50*b* of the laterally extending arm section 50. In an embodiment, the telescopic link linear actuator 56 is, once again, an hydraulic cylinder, but one skilled in the art will again understand that, in an alternative embodiment, the telescopic link linear actuator 56 could be another type of linear actuator. Moreover, one skilled in the art will understand that, in an alternative embodiment (not shown), the first link 50*a* and the second link 50*b* could be joined differently than telescopically, i.e. the first link 50*a* and the second link 50*b* could be movable linearly along a common axis, without being telescopic.

One skilled in the art will understand that, in an alternative embodiment, not shown, the mechanical arm 42 could present a different configuration than the embodiment shown and/or could include different components to provide a similar degree of freedom (i.e. to allow the lateral displacement of a section of the mechanical arm 42 substantially along the lateral axis Y). For example and without being limitative the collinear joint 57 could connect two sections of the mechanical arm 42 different than the sections of the embodiment shown and/or could be a lineal joint or an orthogonal joint rather than a collinear joint.

One skilled in the art will also understand that, in an alternative embodiment (not shown), the laterally extending arm section 50 could be free of collinear joint 57 or similar assembly, thereby not providing the above-described additional degree of freedom.

The longitudinally extending arm section 60 extends substantially along the longitudinal axis X. In the embodiment shown, the mechanical arm 42 further includes an orthogonal joint 63 connecting the longitudinally extending arm section 60 to the distal end 52 of the laterally extending arm section 50. The orthogonal joint 63 allows linear movement of the longitudinally extending arm section 60 with respect to the laterally extending arm section 50 and the transport assembly 16.

In the embodiment shown, the orthogonal joint 63 includes a sliding mechanism 64 allowing the longitudinally extending arm section 60 to slide substantially parallel to the longitudinal axis X. In an embodiment, the sliding mechanism 64 is a conventional sliding mechanism including a profile groove 65 and a guiding roller (not shown) engageable into the profile groove 65 and displaceable therealong. In the embodiment shown, a sliding mechanism actuator 67 is also provided. The sliding mechanism actuator 67 is mounted between a fixed section (e.g. the portion including the profile groove 65 in the embodiment shown) and a movable section (e.g. the portion including the guiding roller and corresponding components in the embodiment shown) of the orthogonal joint 63. In an embodiment, the sliding mechanism actuator 67 is an hydraulic cylinder, but one skilled in the art will understand that, in an alternative embodiment, the proximal end linear actuator 54 could be another type of actuator, such as an hydraulic motor used to actuate a roller chain or the like.

In an embodiment, the orthogonal joint 63 operates as a movement absorption mechanism 68 which substantially cancels the forward displacement of the apparatus 10 during a capture phase of the bale 12 and substantially prevents the dragging of the bale 12 on the ground during this time period. In such an embodiment, the linear movement of the longitudinally extending arm section 60 with respect to the laterally extending arm section 50 and the transport assembly 16 is the opposite of the longitudinal movement of the transport assembly 16, while the bale 12 is being captured by the prehension end effector 80. In other words, the linear movement of the longitudinally extending arm section 60 with respect to the laterally extending arm section 50 and the transport assembly 16 substantially matches a travel distance of the transport assembly 16 while the bale 12 is being captured by the prehension end effector 80, but in an opposite direction. Hence, the linear movement of the longitudinally extending arm section 60 with respect to the laterally extending arm section 50 and the transport assembly 16 substantially cancels the movement of the apparatus 10 and prevents dragging of the bale 12 on the ground during the capture thereof. In such an embodiment, the sliding mechanism actuator 67 can allow substantially free rearward movement of the longitudinally extending arm section 60 from a forward configuration (see FIGS. 2 to 4) (i.e. in a direction opposite to the direction of displacement of the apparatus 10). Hence, the longitudinally extending arm section 60 can freely move rearwardly with respect to the bale loading platform 20, towards a rearward configuration (see FIG. 5B), to substantially cancel the forward displacement of the apparatus 10, thereby substantially preventing the dragging of the bale 12 as the bale is engaged and captured by the prehension end effector 80. The sliding mechanism actuator 67 can subsequently drive the longitudinally extending arm section 60 forward back to the forward configuration (i.e. in a direction corresponding to the direction of displacement of the apparatus 10 of a distance equivalent to the previous rearward movement of the longitudinally extending arm section 60), once the bale 12 has been lifted off the ground and/or has been released onto the bale loading platform 20.

One skilled in the art will understand that, to substantially prevent dragging of the bale 12 on the ground, the bale should be lifted off the ground during the operation of the movement absorption mechanism 68 (before the movement absorption mechanism 68 reaches a configuration where no further rearward movement is possible).

Once again, one skilled in the art will understand that, in an alternative embodiment, not shown, the mechanical arm 42 could present a different configuration than the embodiment shown and/or could include different components to provide a similar degree of freedom (i.e. to allow the longitudinal displacement of a section of the mechanical arm 42, substantially along the lateral axis Y, in order to substantially cancel the displacement of the apparatus 10 on the ground during a bale capture phase). For example and without being limitative, the movement absorption mechanism 68 provided by the orthogonal joint 63 could be positioned between sections of the mechanical arm 42 different than the sections of the embodiment shown or could be positioned to connect the mechanical arm 42 to the chassis 17 of the transport assembly 16. Moreover, one skilled in the art will understand that, in another alternative embodiment, the movement absorption mechanism 68 provided by the orthogonal joint 63 of the embodiment shown, could be embodied by a different joint type allowing the longitudinal displacement of a section of the mechanical arm 42, substantially along the lateral axis Y, in order to substantially cancel the displacement of the apparatus 10 on the ground during a bale capture phase, such as, for example and without being limitative, a linear joint, a collinear joint or the like.

In the embodiment shown, the mechanical arm 42 further includes a rotational joint 73 pivotally connecting the longitudinally extending arm section 60 to the end section 70. As mentioned above, the end section 70 is connected to the end effector 80 which interacts with the bales 12. Therefore, the rotational joint 73 allows pivoting of the end section 70 and the end effector 80 connected thereto with respect to the longitudinally extending arm section 60. In the embodiment shown, an end section linear actuator 74 is mounted between the longitudinally extending arm section 60 and the end section 70, to pivot the end section 70 with regards to the longitudinally extending arm section 60. In an embodiment, the end section linear actuator 74 is an hydraulic cylinder, but one skilled in the art will understand that, in an alternative embodiment, the end section linear actuator 74 could be another type of linear actuator, a rotary actuator, or the like.

Once again, one skilled in the art will understand that, in an alternative embodiment, not shown, the mechanical arm 42 could present a different configuration than the embodiment shown and/or could include different components to provide a similar degree of freedom (i.e. to allow pivoting of a section of the mechanical arm along the longitudinal axis X). For example and without being limitative the rotational joint 73 could pivotally connect two sections of the mechanical arm 42 different than the sections of the embodiment shown and/or could be a twisting joint or a revolving joint rather than a rotational joint.

In the embodiment shown, the mechanical arm 42 further includes a twisting joint 75 rotatingly connecting the end section 70 to the end effector 80. The twisting joint 75 allows rotation of the end effector 80 with respect to the end section 70. Hence, the twisting joint 75 allows the end effector 80 to be configured between the substantially vertical prehension configuration (see FIGS. 2 and 3) and the substantially horizontal prehension configuration (See FIG. 4). In the embodiment shown, a twisting actuator 76 is mounted between the end section 70 and the end effector 80. In the embodiment shown, the twisting actuator 76 is a linear actuator connected at a connection point of the end effector 80 offset from a rotating center thereof, to rotate the end effector 80 with regards to the end section 70. In an embodiment, the twisting actuator 76 is an hydraulic cylinder, but one skilled in the art will understand that, in an alternative embodiment, the twisting actuator 76 could be another type of linear actuator connected at a connection point of the end effector 80 offset from a rotating center thereof, a rotary actuator for rotating the end effector 80 with regards to the end section 70, or the like.

Once again, one skilled in the art will understand that, in an alternative embodiment, not shown, the mechanical arm 42 could present a different configuration than the embodiment shown and/or could include different components to provide a similar degree of freedom (i.e. to allow rotation of the end effector 80 between the substantially vertical prehension configuration and the substantially horizontal prehension configuration). One skilled in the art will also understand that, in an alternative embodiment (not shown), the laterally extending arm section 50 could be free of twisting joint 75 or similar assembly, thereby not providing the above-described additional degree of freedom. For example and without being limitative the twisting joint 75 could connect two sections of the mechanical arm 42 different than the end section 70 and the effector 80 and/or could be a rotational joint or a revolving joint rather than a twisting joint.

In the embodiment shown, the end effector 80 is a two jaws angular gripper. Hence, in the embodiment shown, the end effector 80 includes a first jaw 81 and a second jaw 82 configurable between an open configuration (See FIGS. 2 to 5A) and a closed configuration (See FIG. 5B to 5D) in an arcing motion. In the embodiment shown, the first jaw 81 and the second jaw 82 each have a curvilinear configuration, to substantially conform to the outer surface of rounded bales 12, thereby resulting in better engagement therebetween during capture and retention of the bales 12 by the prehension end effector 80. One skilled in the art will understand that, in an alternative embodiment (not shown), the first jaw 81 and the second jaw 82 could each have a configuration different from a curvilinear configuration, such as, for example and without being limitative, a substantially straight configuration. One skilled in the art will understand that the two jaws angular gripper with the first jaw 81 and the second jaw 82 having a curvilinear configuration favors engagement between the end effector 80 and wrapped bales 12, without tearing of the wrapping material of the bales 12.

In the embodiment shown, the end effector 80 includes two gripper actuators 84. Each one of the two gripper actuators 84 is connected between a gripper body 83 and a corresponding one of the first jaw 81 and the second jaw 82. The gripper actuators 84 allow the first jaw 81 and the second jaw 82 to be configured between the open configuration (See FIGS. 2 to 5A) and the closed configuration (See FIG. 5B to 5D). In the embodiment shown, the two gripper actuators 84 are hydraulic cylinders, but one skilled in the art will understand that, in an alternative embodiment, the two gripper actuators 84 could be another type of linear actuator, or any other actuator for configuring the first jaw 81 and the second jaw 82 between the open configuration and the closed configuration. One skilled in the art will also understand that, in an alternative embodiment (not shown), a single gripper actuator operatively connected to the first jaw 81 and the second jaw 82 of the end effector 80 could be provided to configure the first jaw 81 and the second jaw 82 between the open configuration and the closed configuration. For example and without being limitative, in an embodiment (not shown), the single gripper actuator could be connected between the gripper body 83 and a corresponding one of the first jaw 81 and the second jaw 82, with a mechanical link connecting the first jaw 81 and the second jaw 82 to synchronize the movements thereof.

In the embodiment shown, the first jaw 81 is longer than the second jaw 82, i.e. the first jaw 81 engages a larger section of the bale 12 than the second jaw 82, when the end effector 80 is engaged with the bale 12. As will be described in more details below, this eases the release of the bale 12 onto the bale loading platform 20 by creating a ramp like structure favoring rolling of the bale 12 towards the bale loading platform 20 (and unloading of the bale without tearing of the wrapping material), upon configuration of the first jaw 81 and the second jaw 82 towards the open configuration.

One skilled in the art, will understand that, in an alternative embodiment (not shown), the end effector 80 could be different from the two jaws angular gripper of the embodiment shown, such as, for example and without being limitative, a three jaws gripper, a parallel gripper, or the like.

In the embodiment shown, a roller 86 is provided at a distal end of the first jaw 81. The roller 86 is provided and positioned to reduce the friction between the bale 12 and the first jaw 81 and the second jaw 82 of the end effector 80 during the transition of the first jaw 81 and the second jaw 82 from the open configuration to the closed configuration and vice-versa. Indeed, when the first jaw 81 and the second jaw 82 are engaged with a bale 12 oriented in an horizontal orientation (i.e. with the end effector 80 in the substantially horizontal prehension configuration) and moved from the open configuration to the closed configuration to grasp the bale 12, the bale 12 tends to roll between the first jaw 81 and the second jaw 82 and friction between the bale and the first jaw 81 and the second jaw 82 could result in tearing of the wrapping material of the bale 12. Similarly, when the first jaw 81 and the second jaw 82 are moved from the closed configuration to the open configuration, to release the bale 12, the bale 12 starts to roll between the first jaw 81 and the second jaw 82 and friction between the bale and the first jaw 81 and the second jaw 82 could result in tearing of the wrapping material of the bale 12. Hence, the roller 86 is provided to allow the bale 12 to roll with reduce friction with respect to the first jaw 81 and the second jaw 82 and therefore reduce the probabilities of tearing of the wrapping material.

It will be understood that, in an embodiment, the mechanical arm 42 can be operatively connected to a controller (not shown) which synchronizes the movement of the mechanical arm 42 to perform the capture, retention (and movement of the different sections for positioning of the mechanical arm 42 between the bale engagement configuration and the bale release configuration as the bale is retained, see description below) and the release of the bales 12 onto the bale loading platform 20. The controller can be further operatively connected to a vision system to detect the bales 12 and their position and/or their configuration (i.e. their orientation and/or direction) to guide the movement of the mechanical arm 42 for capture of the bales 12. In an embodiment, the controller can synchronize the movement of the mechanical arm 42 with the displacement of the apparatus 10 on the ground, to substantially prevent the dragging of the captured bales 12 on the ground. Furthermore, the controller can be further operatively connected to the powered vehicle 14 pulling the apparatus 10 to synchronize the speed of the powered vehicle 14 with the movements of the mechanical arm 42. For example and without being limitative, in an embodiment, the ISOBUS protocol can be used for electronic communication between the controller of the apparatus 10 and the powered vehicle 14.

Now referring to FIGS. 5A to 5E, a sequence of operation for capturing, temporarily retaining and subsequently releasing a bale 12 onto the loading platform 20, using the apparatus 10 as described above, will now be described. As previously mentioned, the bales 12 are usually scattered on the ground in a field, with the apparatus being driven around the field by an operator. In the embodiment shown, the apparatus is towed by a powered vehicle 14.

Figure 5A:
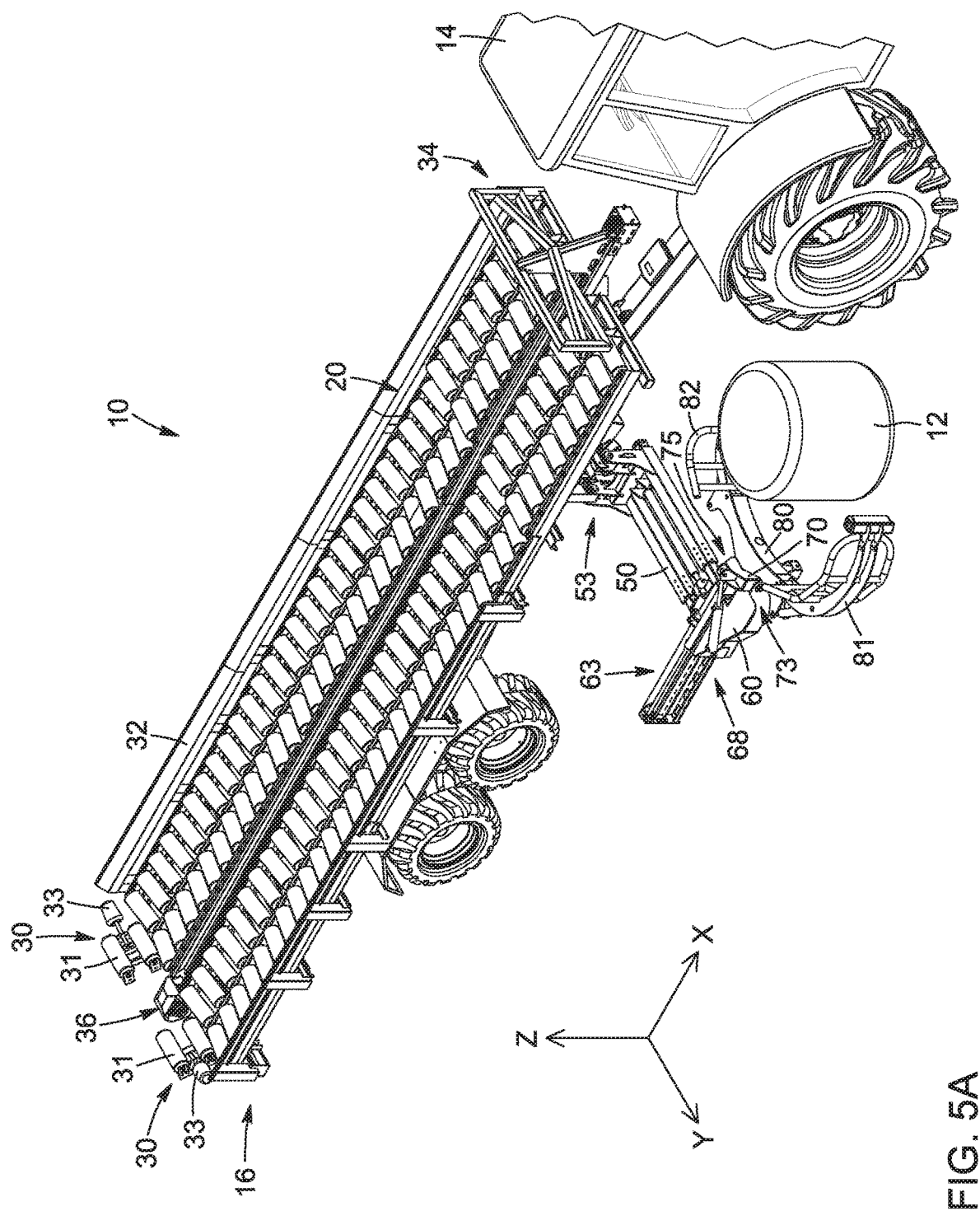

With reference to FIG. 5A, for each one of the bales 12, the apparatus initially engages the bale 12 with the grasping assembly 40 configured in a bale engagement configuration as the apparatus 10 is driven around a field where the bales 12 are scattered on the grounds. In the bale engagement configuration, the end effector 80 of the mechanical arm 42 is positioned close to the ground and is configured in the open configuration. The movement absorption mechanism 68 is configured in the forward configuration (i.e. in the position where it can absorb forward movement of the apparatus 10 through rearward movement of at least a section of the mechanical arm 42). In the embodiment shown, the longitudinal arm section 60 is therefore positioned at a forward end of the sliding mechanism 64 of the orthogonal joint 63. In the embodiment shown, the end effector 80 is also positioned in the substantially vertical prehension configuration, given that the bale 12 is oriented in a vertical (or upright) orientation. One skilled in the art will however understand that, in an alternative embodiment (not shown), the end effector 80 could also be positioned in the substantially horizontal prehension configuration (see FIG. 4), to engage a bale positioned in an horizontal (or sideways) orientation.

Figure 5B:
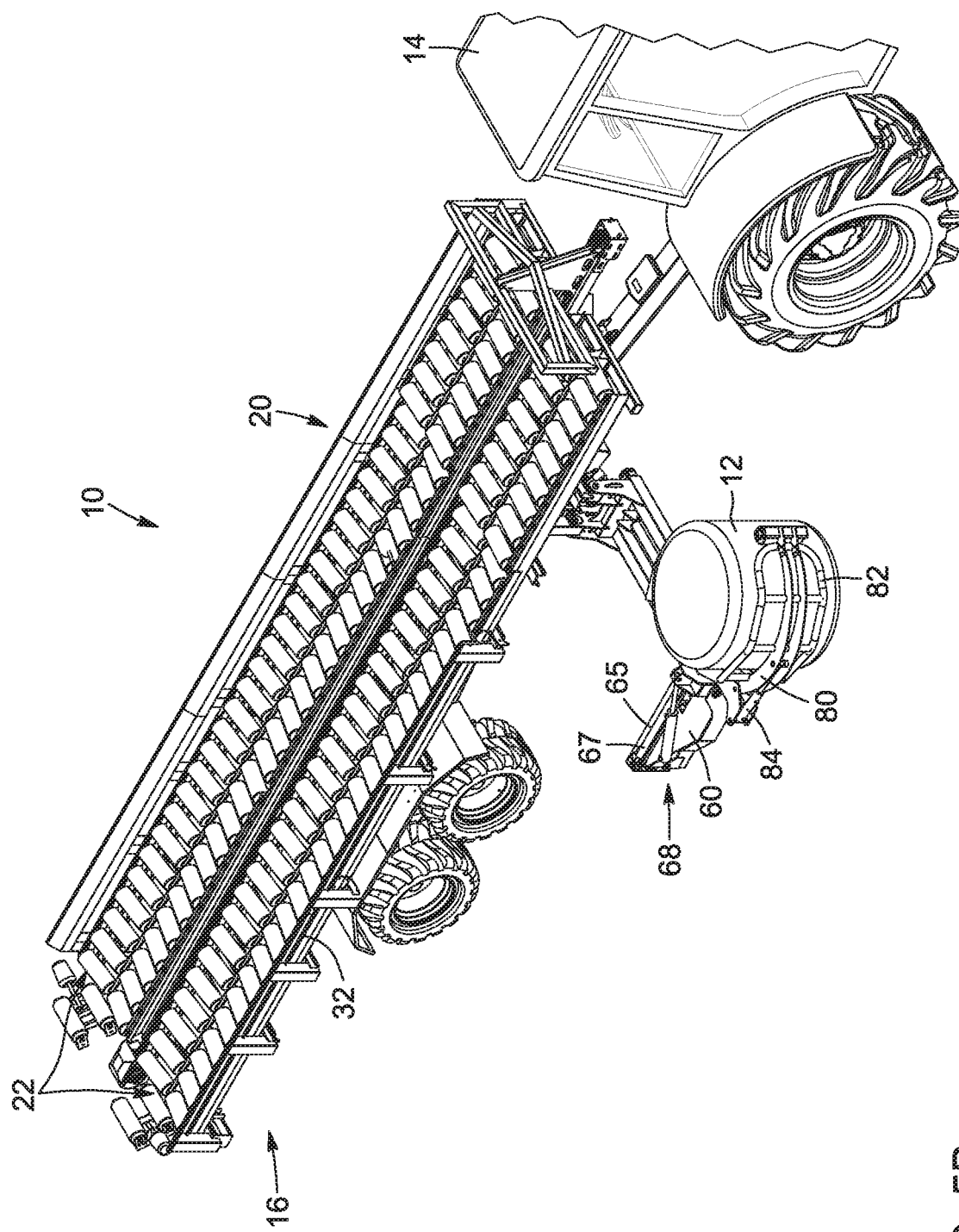

With reference to FIG. 5B, during the bale capture phase where the bale 12 is captured by the prehension end effector 80, the grasping assembly 40 is configured in the bale capture configuration for capturing and subsequently lifting the corresponding one of the bales off the ground. In the bale capture configuration, the end effector 80 of the mechanical arm 42 is configured in the closed configuration. Hence, in the embodiment shown, the first jaw 81 and the second jaw 82 engage the outer surface of the bale 12 for grasping of the bale 12 by the end effector 80. During the bale capture phase, the movement absorption mechanism 68 moves towards the rearward configuration, such that substantially no dragging of the bale on the ground occurs as the bale 12 is being grasped by the end effector 80, even if the apparatus 10 is continuously moved forward during this time period.

Figure 5C:
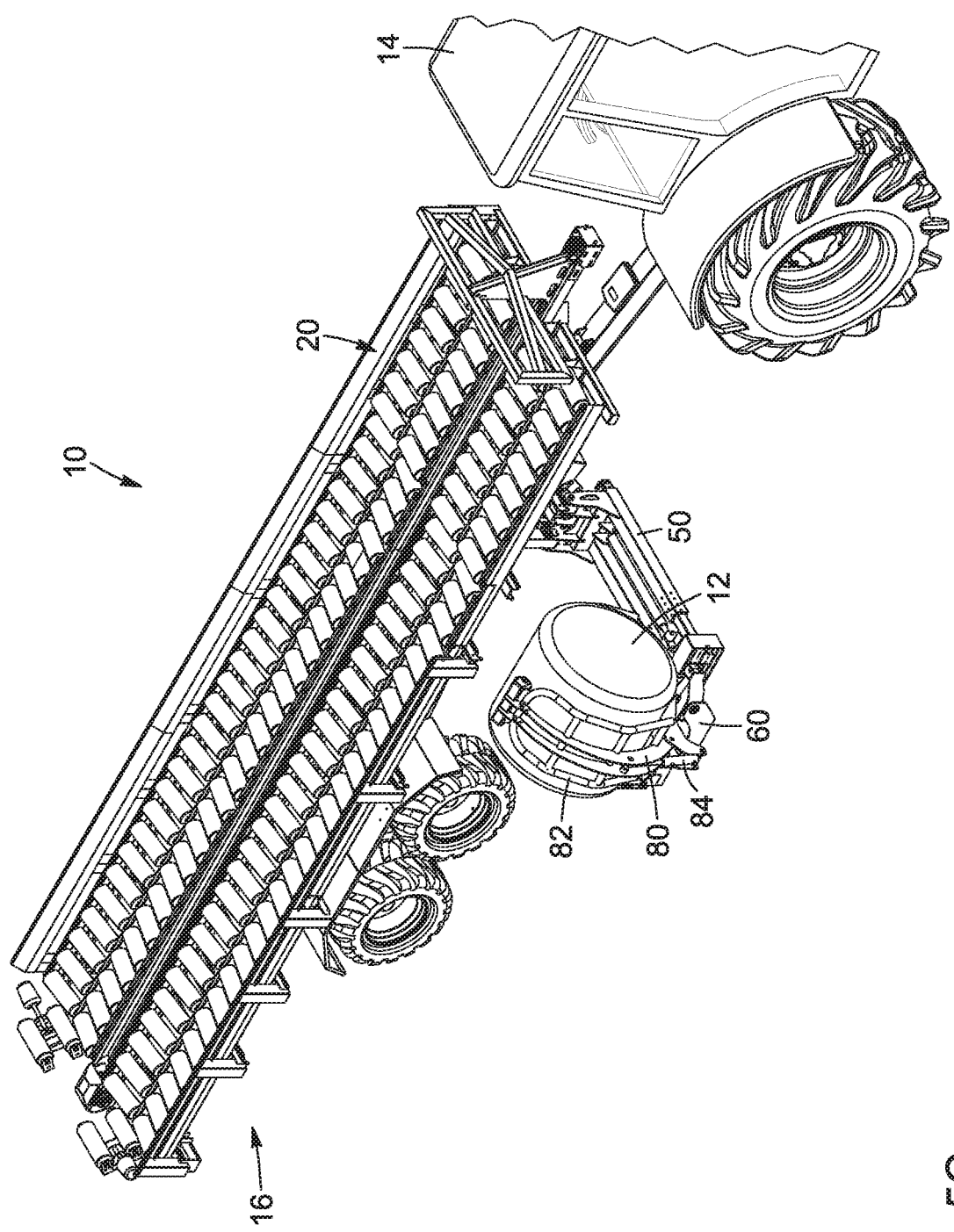
Figure 5D:
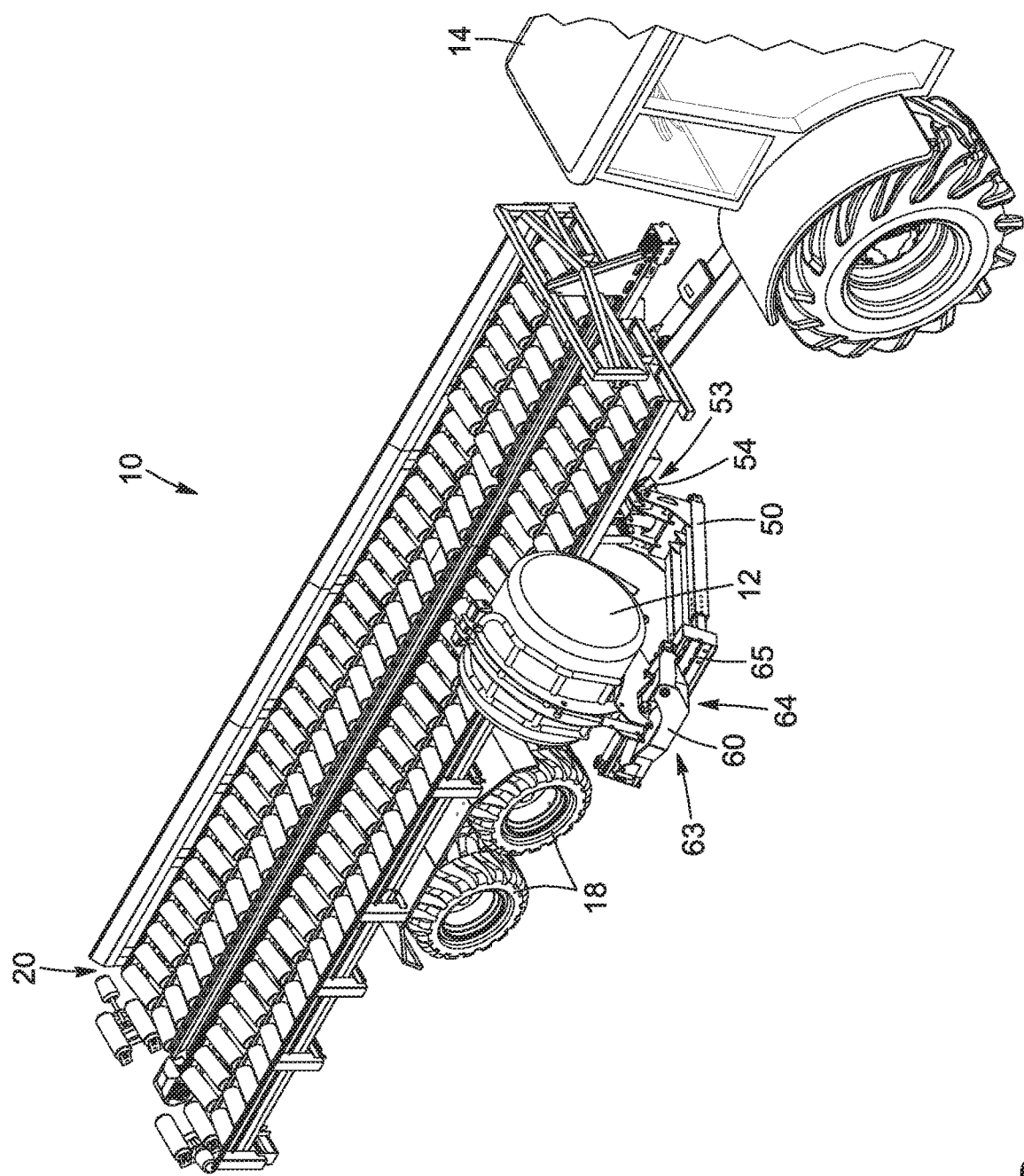

Now referring to FIGS. 5C and 5D, following the bale capture phase, the bale 12 is retained by the prehension end effector 80 as the grasping assembly 40 is moved towards a bale release configuration. In the embodiment shown, to move the grasping assembly 40 towards the bale release configuration, the end section 70 of the mechanical arm 42 is pivoted with regards to the longitudinal arm section 60 (at the rotational joint 73) (see FIG. 5C) and laterally extending arm section 50 of the mechanical arm 42 is pivoted with regards to the transport assembly 16 (at the rotational joint 53) (see FIG. 5D). Hence, in the embodiment shown, the orientation of the bale 12 is changed for the bale 12 to be oriented in an horizontal orientation (i.e. to lie longitudinally substantially parallel to the longitudinal axis X) and the bale 12 is lifted above the bale loading platform 20 for subsequent release thereon.

One skilled in the art will understand that, in an embodiment where the bale is captured in an horizontal configuration, the end effector 80 can also be rotated with regard to the end section 70 of the mechanical arm 42 (at the twisting joint 75) in order to change the orientation of the bale 12 during the transition of the grasping assembly 40 towards the bale release configuration.

One skilled in the art will also understand that, in an embodiment (not shown), the mechanical arm 42 could also be extended during the transition of the grasping assembly 40 towards the bale release configuration, to allow the release of the bale 12 on top of bales previously received in the bale conveying sections 22, thereby allowing an additional row of bales 12 to be created above and between the bales loaded in the bale conveying sections 22.

Figure 5E:
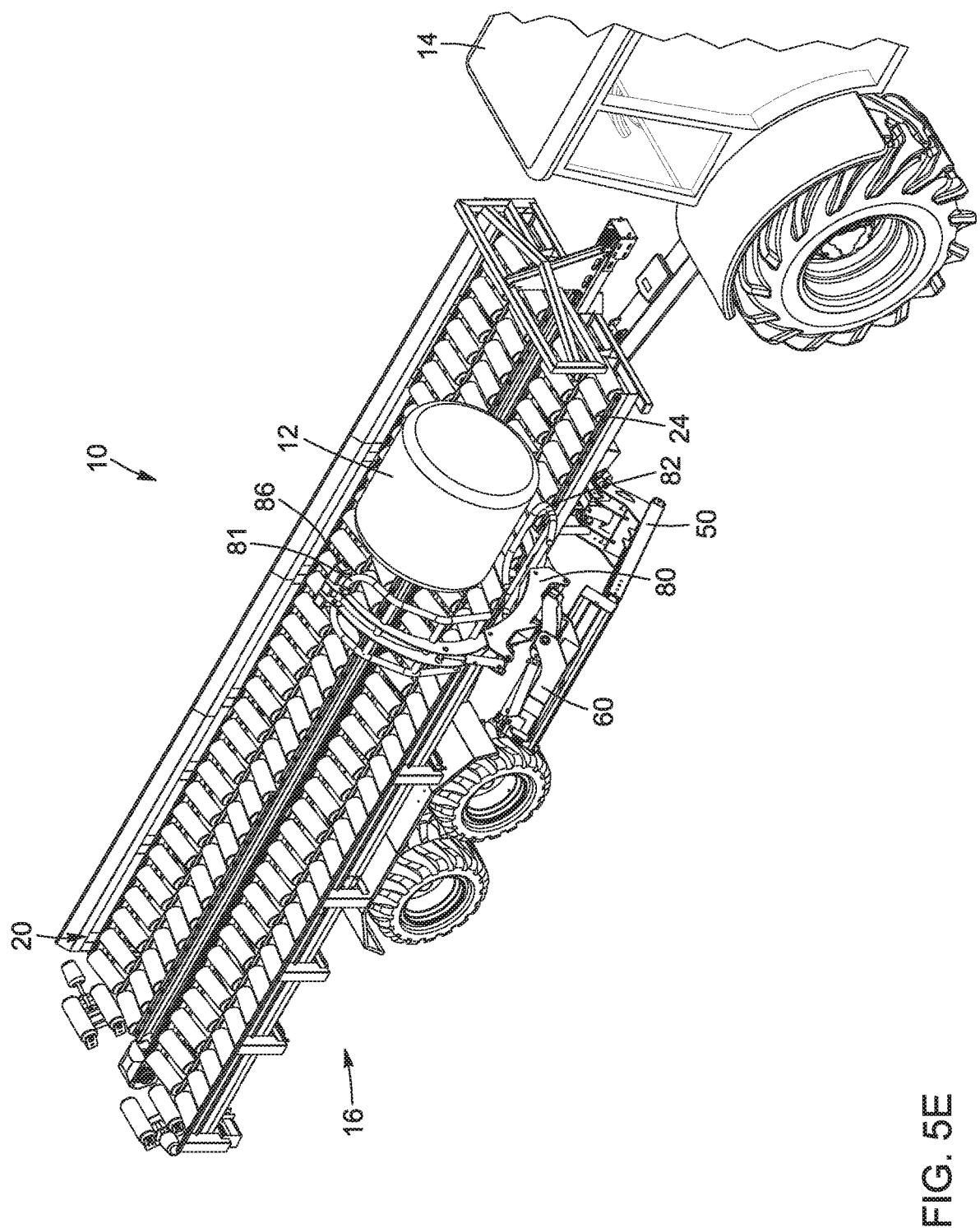

With reference to FIG. 5E, in the bale release configuration, the end effector 80 of the mechanical arm 42 is positioned above the bale loading platform 20 and is configured in the open configuration to release the bale 12 onto the bale loading platform 20. In an embodiment, in the bale release configuration, the end effector 80 of the mechanical arm 42 is longitudinally substantially aligned with the bale loading section 24 of the bale loading platform 20, to release the bale 12 at the bale loading section 24. In an embodiment, in the bale release configuration, the end effector 80 is positioned in a substantially horizontal prehension configuration, with the second jaw 82 at a lower end and the first jaw 81 at an upper end. As mentioned above, in the embodiment shown, the second jaw 82 is shorter than the first jaw 81 and defines a ramp like structure favoring rolling of the bale 12 towards the bale loading platform 20 and therefore substantially prevents tearing of the wrapping material during the release of the bale 12. Hence, the configuration of the grasping assembly 40 in the bale release configuration results in the bale 12 being released onto the bale loading platform 20, for subsequent transport thereof. In an embodiment, after being released at the bale storing section 24 of the bale loading platform 20, the bale 12 is conveyed towards the bale storing section 26 thereof.

With reference to FIGS. 6 and 7, once the collection of the bales in the field is finished, the apparatus 10 can be driven to a location where the bales are to be discharged and the bale loading platform 20 can be moved from the transport configuration to the discharge configuration to discharge the bales. As mentioned above, in the discharge configuration, the bale loading platform 20 is tilted rearwardly, with the bale stopper(s) 30 in the retracted (or inoperative) configuration to allow discharge of the bales 12. The apparatus 10 is then moved forwardly and the bale pusher 34 is used to push the bales 12 towards the rear end 22b of the loading platform 20, thereby discharging the bales 12 with substantially no dragging of the bales 12 on the ground and with adjacent bales 12 being held proximal to one another. As mentioned above, the bales 12 can be discharged in a vertical orientation if the bale loading platform 20 is tilted to a vertical discharge inclination (see FIG. 6) or in an horizontal orientation if the bale loading platform 20 is tilted to a vertical discharge inclination (see FIG. 7).

Several alternative embodiments and examples have been described and illustrated herein. The embodiments of the invention described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while specific embodiments have been illustrated and described, numerous modifications come to mind without significantly departing from the scope of the invention as defined in the appended claims.

The invention claimed is:

1. An apparatus for collecting and transporting bales, the apparatus having a longitudinal axis and a lateral axis and comprising:

a transport assembly including a bale loading platform and a chassis with the bale loading platform extending above the chassis and being mounted thereto, the bale loading platform comprising at least one bale conveying section extending along the longitudinal axis, between a forward end and a rearward end of the bale loading platform, each one of the at least one bale conveying section including a bale conveying mechanism for moving the bales towards the rearward end of the bale loading platform; and a grasping assembly operatively connected to the transport assembly, the grasping assembly including a mechanical arm having a prehension end effector engageable with the bales, the grasping assembly being configurable between a bale engagement configuration for engaging a corresponding one of the bales laying on a ground surface, a bale capture configuration for capturing and lifting the corresponding one of the bales off the ground surface and a bale release configuration for releasing the corresponding one of the bales onto the bale loading platform and comprising a movement absorption mechanism operative to translate parallel to the longitudinal axis to substantially cancel a forward displacement of the apparatus parallel to the longitudinal axis during capture of the bales.

2. The apparatus of claim 1, wherein the apparatus is driven in a displacement direction and wherein the movement absorption mechanism includes at least one section of the mechanical arm moveable longitudinally along the longitudinal axis in a direction opposed to the displacement direction of the apparatus.

3. The apparatus of claim 2, wherein the mechanical arm comprises a laterally extending arm section extending substantially along the lateral axis and a longitudinally extending arm section extending substantially along the longitudinal axis, the laterally extending arm section being connected to the longitudinally extending arm section by an orthogonal joint and being movable longitudinally along the longitudinal axis.

4. The apparatus of claim 3, wherein the orthogonal joint includes a sliding mechanism and an orthogonal joint actuator, the orthogonal joint actuator allowing substantially free movement of the longitudinally extending arm section along the sliding mechanism in the direction opposed to the displacement direction of the apparatus and driving the longitudinally extending arm section along the sliding mechanism in the displacement direction of the apparatus.

5. The apparatus of claim 1, wherein the prehension end effector is rotatable between a substantially vertical prehension configuration for engaging a corresponding one of the bales in a vertical orientation and a substantially horizontal configuration for engaging a corresponding one of the bales in an horizontal orientation.

6. The apparatus of claim 1, wherein the at least one bale conveying section comprises a bale loading section and a bale storing section, the conveying mechanism being higher in the bale loading section than in the bale storing section to define a bale stopping step therebetween.

7. The apparatus of claim 1, wherein the bale conveying mechanism comprises a plurality of supporting rollers spaced apart from one another along the longitudinal axis.

8. The apparatus of claim 7, wherein the bale conveying mechanism comprises at least two longitudinally extending rows of supporting rollers.

9. The apparatus of claim 8, wherein the at least two rows of supporting rollers are configured in a V-shaped configuration along at least a section of the bale conveying section.

10. The apparatus of claim 1, wherein the bale loading platform comprises at least two bale conveying sections laterally spaced apart of a lateral spacing distance and wherein at least one of the at least two bale conveying sections is laterally movable along the lateral axis to vary the lateral spacing distance between the at least two bale conveying sections.

11. The apparatus of claim 1, wherein the bale loading platform comprises at least one lateral bale holder at a lateral end thereof, each one of the at least one lateral bale holder being configurable between a holding configuration where the lateral bale holder engages an outer surface of at least one bale received on the bale loading platform and a distal configuration where the lateral bale holder extends away from the at least one bale received on the bale loading platform.

12. The apparatus of claim 1, wherein the bale loading platform is tiltable between a transport configuration and a discharge configuration.

13. The apparatus of claim 12, wherein, in the discharge configuration, the bale loading platform is tiltable to a vertical discharge inclination in which the bale loading platform is tilted of between about 5° and about 10° with respect to the ground surface.

14. The apparatus of claim 13, wherein the apparatus further comprises a bale stopper configurable between an extended configuration and a retracted configuration and comprising at least one central support roller configured to support the bales being discharged, from below, when the bale stopper is configured in the retracted configuration and a lateral support roller engaging a lateral section of the bales being discharged when the bale stopper is configured in the retracted configuration to laterally support the bales during the discharge.

15. The apparatus of claim 12, wherein, in the discharge configuration, the bale loading platform is tiltable to an horizontal discharge inclination in which the bale loading platform is tilted of between about 15° and about 20° with respect to the ground surface.

16. An apparatus for collecting and transporting bales scattered on a field, the apparatus being driven in a displacement direction and having a longitudinal axis and a lateral axis, the apparatus comprising:
a supporting chassis;
a bale loading platform configured to receive and temporarily support the bales, the bale loading platform extending above the supporting chassis and being engageable with and securable to the supporting chassis and comprising at least one bale conveying section extending along the longitudinal axis between a forward end and a rearward end thereof, the bale conveying section including a bale conveying mechanism for moving the bales towards the rearward end of the bale loading platform;
a grasping assembly operatively connected to one of the supporting chassis and the bale loading platform, the grasping assembly including a mechanical arm having a prehension end effector engageable with the bales, the mechanical arm having at least three degrees of freedom and being movable between a bale engagement configuration for engaging a corresponding one of the bales scattered on the field and a bale release configuration for releasing the corresponding one of the bales onto the bale loading platform, the grasping assembly further comprising a movement absorption mechanism including at least one section of the mechanical arm moveable along the longitudinal axis in a direction opposite to the displacement direction of the apparatus.

17. The apparatus of claim 16, wherein the mechanical arm comprises a laterally extending arm section extending substantially along the lateral axis and a longitudinally extending arm section extending substantially along the longitudinal axis, the laterally extending arm section being connected to the longitudinally extending arm section by an orthogonal joint and being movable longitudinally along the longitudinal axis.

18. The apparatus of claim 17, wherein the orthogonal joint includes a sliding mechanism and an orthogonal joint actuator, the orthogonal joint actuator allowing substantially free movement of the longitudinally extending arm section along the sliding mechanism in the direction opposed to the displacement direction of the apparatus and driving the longitudinally extending arm section along the sliding mechanism in the displacement direction of the apparatus.

19. The apparatus of claim 16, wherein the mechanical arm has at least four degrees of freedom, the mechanical arm allowing a change in at least one of an orientation and a direction of the bales between the bale engagement configuration and the bale release configuration.

20. The apparatus of claim 19, wherein the mechanical arm has at least five degrees of freedom.

21. The apparatus of claim 16, wherein the prehension end effector is rotatable between a substantially vertical prehension configuration for engaging a corresponding one of the bales in an vertical orientation and a substantially horizontal configuration for engaging a corresponding one of the bales in an horizontal orientation.

22. The apparatus of claim 16, wherein the at least one bale conveying section comprises a bale loading section and a bale storing section, the conveying mechanism being higher in the bale loading section than in the bale storing section to define a bale stopping step therebetween.

23. The apparatus of claim 16, wherein the bale conveying mechanism comprises a plurality of supporting rollers spaced apart from one another along the longitudinal axis, each one of the supporting rollers extending substantially along the lateral axis.

24. The apparatus of claim 23, wherein the bale conveying mechanism comprises at least two longitudinally extending rows of supporting rollers.

25. The apparatus of claim 24, wherein the at least two rows of supporting rollers are configured in a V-shaped configuration along at least a section of the bale conveying section.

26. The apparatus of claim 16, wherein the bale loading platform comprises at least two bale conveying sections laterally spaced apart of a lateral spacing distance and wherein at least one of the at least two bale conveying sections is laterally movable along the lateral axis to vary the lateral spacing distance between the at least two bale conveying sections.

27. The apparatus of claim 16, wherein the bale loading platform comprises at least one lateral bale holder at a lateral end thereof, each one of the at least one lateral bale holder being configurable between a holding configuration where the lateral bale holder engages an outer surface of at least one bale received on the bale loading platform and a distal configuration where the lateral bale holder extends away from the at least one bale received on the bale loading platform.

28. The apparatus of claim 16, wherein the bale loading platform is tiltable between a transport configuration and a discharge configuration.

29. The apparatus of claim 28, wherein, in the discharge configuration, the bale loading platform is tiltable to a vertical discharge inclination in which the bale loading platform is tilted of between about 5° and about 10° with respect to the ground surface.

30. The apparatus of claim 29, wherein the apparatus further comprises a bale stopper configurable between an extended configuration and a retracted configuration and comprising at least one central support roller configured to support the bales being discharged, from below, when the bale stopper is configured in the retracted configuration and a lateral support roller engaging a lateral section of the bales being discharged when the bale stopper is configured in the retracted configuration to laterally support the bales during the discharge.

31. The apparatus of claim 16, wherein, in the discharge configuration, the bale loading platform is tiltable to a horizontal discharge inclination in which the bale loading platform is tilted of between about 15° and about 20° with respect to the ground surface.

* * * * *